US012627491B2

(12) United States Patent (10) Patent No.: US 12,627,491 B2
Palanigounder et al. (45) Date of Patent: May 12, 2026

(54) KEY AND COUNTER MANAGEMENT IN WIRELESS SYSTEMS

(71) Applicant: QUALCOMM Incorporated, San Diego, CA (US)

(72) Inventors: Anand Palanigounder, San Diego, CA (US); Adrian Edward Escott, Reading (GB)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/780,348

(22) Filed: Jul. 22, 2024

(65) Prior Publication Data

US 2025/0047479 A1      Feb. 6, 2025

Related U.S. Application Data

(60) Provisional application No. 63/517,794, filed on Aug. 4, 2023.

(51) Int. Cl.
H04L 9/08 (2006.01)
H04L 9/06 (2006.01)
H04W 12/72 (2021.01)

(52) U.S. Cl.
CPC .......... H04L 9/0894 (2013.01); H04L 9/0643 (2013.01); H04W 12/72 (2021.01)

(58) Field of Classification Search
CPC .... H04L 9/0894; H04L 9/0643; H04W 12/72; H04W 12/041
See application file for complete search history.

(56) References Cited

U.S. PATENT DOCUMENTS

| | | | |
|---|---|---|---|
| 7,903,812 B2 | 3/2011 | Greco et al. | |
| 11,373,013 B2 | 6/2022 | Kida et al. | |
| 2019/0253881 A1* | 8/2019 | Gage | H04W 12/03 |
| 2020/0322795 A1* | 10/2020 | Eskelinen | H04W 12/041 |
| 2022/0174497 A1 | 6/2022 | Guo et al. | |
| 2022/0191696 A1 | 6/2022 | Yoshizawa et al. | |
| 2023/0171099 A1 | 6/2023 | Krishan et al. | |
| 2023/0388802 A1* | 11/2023 | Hu | H04W 12/033 |

FOREIGN PATENT DOCUMENTS

| | | | |
|---|---|---|---|
| CN | 114168606 A | 3/2022 |
| JP | 4586075 B2 | 11/2010 |
| WO | 2022067803 A1 | 4/2022 |

OTHER PUBLICATIONS

Gruber R (Apple)., et al., "Handling of SOR Counter and the UE Parameter Update Counter If Stored in NVM", 3GPP TSG-CT WG1 Meeting #139, C1-230308 (was C1-23xxxx), Type CR, CR 5043, 5GPROTOC18, 3rd Generation Partnership Project, Mobile Competence Centre, 650, Route Des Lucioles, F-06921 Sophia-Antipolis Cedex, France, vol. CT WG1, No. Athens, GR, Feb. 27-Mar. 3, 2023, Feb. 20, 2023, 9 Pages, XP052238644, abstract.

Gruber R (Apple)., et al., "Handling of SOR Counter and the UE Parameter Update Counter If Stored in NVM", 3GPP TSG-CT WG1 Meeting #141e, C1-232043 (was C1-230308), Type CR, CR 5043, 5GPROTOC18, 3rd Generation Partnership Project, Mobile Competence Centre, 650, Route Des Lucioles, F-06921 Sophia-Antipolis Cedex, France, vol. CT WG1, No. Online, Apr. 17-Apr. 21, 2023, Apr. 6, 2023, 7 Pages, XP052294479, abstract paragraph [4..4.11.6], paragraph [6.14.2.3], paragraph [5.4.1.2.2.8.].

International Search Report and Written Opinion—PCT/US2024/039201—ISA/EPO—Nov. 4, 2024.

S3: "Handling of KAUSF Upon Successful Primary Authentication", 3GPP TSG-SA3 Meeting #103-e, S3-212289, 3rd Generation Partnership Project, Mobile Competence Centre, 650, Route Des Lucioles, F-06921 Sophia-Antipolis Cedex, France, vol. SA WG3, No. e-meeting, May 17-May 28, 2021, May 30, 2021, 20 Pages, XP052017539, abstract.

Cui Z., et al., "Attacks Against Security Context in 5G Network", arXiv:2303.10955v1 [cs. CR] Mar. 20, 2023, pp. 1-16.

ETSI: "5G, Security Architecture and Procedures for 5G System (3GPP TS 33.501 Version 17.10.0 Release 17)", TS 133 501 V17.10.0, Jul. 2023, 296 Pages.

* cited by examiner

*Primary Examiner* — Brian Whipple
(74) *Attorney, Agent, or Firm* — Norton Rose Fulbright US LLP

(57) ABSTRACT

Disclosed are wireless communications systems and techniques. For example, a wireless communication device (e.g., a user equipment (UE)) compares a first key identifier (generated from a key stored in a first storage unit, such as a universal subscriber identity module) to a second key identifier (stored in a second storage unit, such as non-volatile memory) to identify a mismatch between the key identifiers. Based on the mismatch, the device replaces, in the second storage unit, the second key identifier. In some examples, the device verifies integrity of a message using the key, replaces the second key identifier with the first key identifier, and updates a counter based on the message. In a second illustrative example, the device replaces the key with a replacement key, replaces the second key identifier with the third key identifier based on the replacement key, and resets a counter.

21 Claims, 10 Drawing Sheets

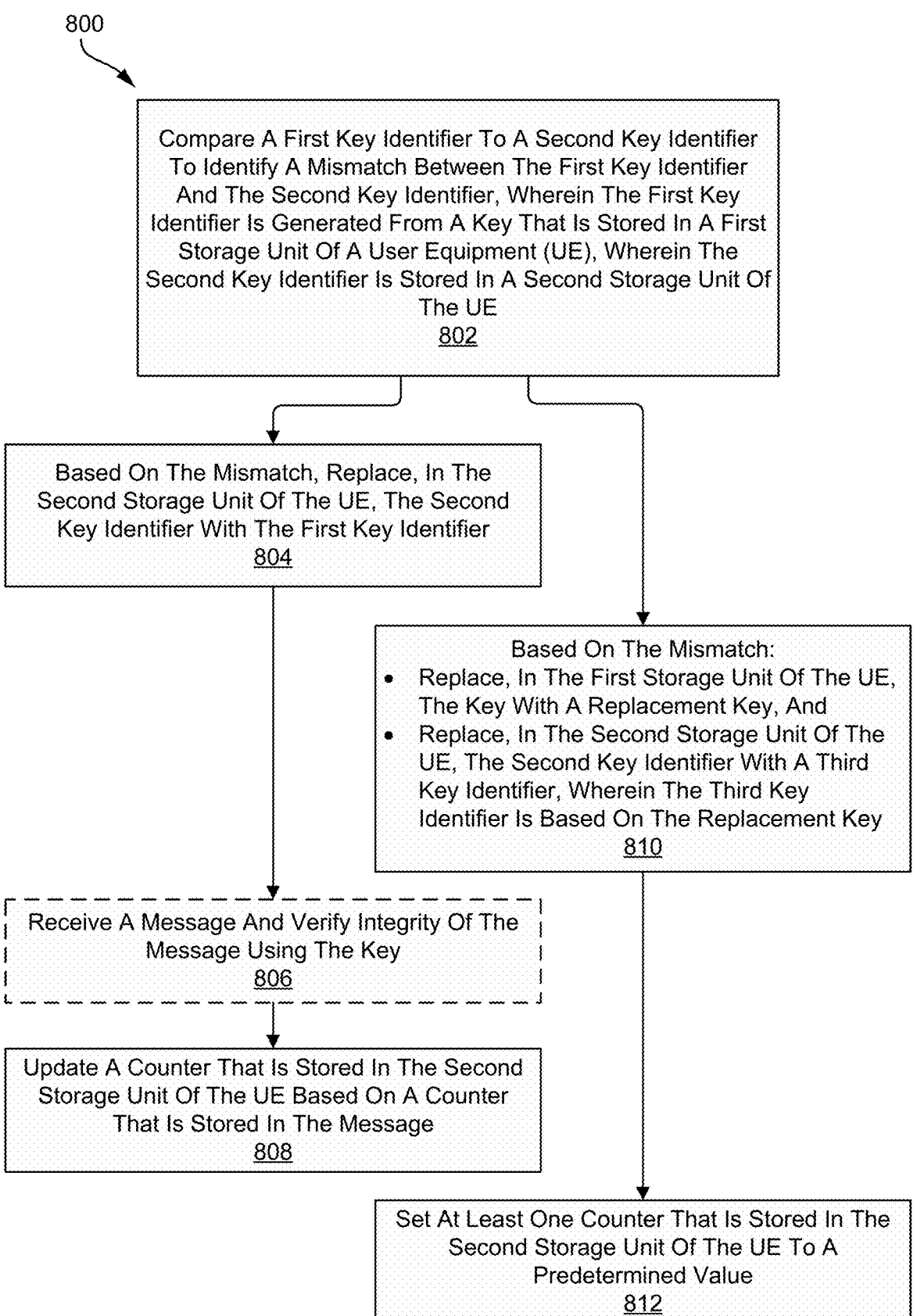

800

Compare A First Key Identifier To A Second Key Identifier
To Identify A Mismatch Between The First Key Identifier
And The Second Key Identifier, Wherein The First Key
Identifier Is Generated From A Key That Is Stored In A First
Storage Unit Of A User Equipment (UE), Wherein The
Second Key Identifier Is Stored In A Second Storage Unit Of
The UE
802

Based On The Mismatch, Replace, In The
Second Storage Unit Of The UE, The Second
Key Identifier With The First Key Identifier
804

Based On The Mismatch:
• Replace, In The First Storage Unit Of The UE,
  The Key With A Replacement Key, And
• Replace, In The Second Storage Unit Of The
  UE, The Second Key Identifier With A Third
  Key Identifier, Wherein The Third Key
  Identifier Is Based On The Replacement Key
810

Receive A Message And Verify Integrity Of The
Message Using The Key
806

Update A Counter That Is Stored In The Second
Storage Unit Of The UE Based On A Counter
That Is Stored In The Message
808

Set At Least One Counter That Is Stored In The
Second Storage Unit Of The UE To A
Predetermined Value
812

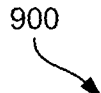

Compare A First Key Identifier To A Second Key Identifier
To Identify A Mismatch Between The First Key Identifier
And The Second Key Identifier, Wherein The First Key
Identifier Is Generated From A Key That Is Stored In A First
Storage Unit Of A User Equipment (UE), Wherein The
Second Key Identifier Is Stored In A Second Storage Unit Of
The UE
<u>902</u>

Replace The Second Key Identifier In The Second Storage
Unit Of The UE Based On The Mismatch
<u>904</u>

FIG. 9

KEY AND COUNTER MANAGEMENT IN WIRELESS SYSTEMS

CROSS-REFERENCE TO RELATED APPLICATIONS

This application claims the benefit of U.S. Provisional Application No. 63/517,794, filed Aug. 4, 2023, and titled "Key and Counter Management in Wireless Systems," which is hereby incorporated by reference in its entirety and for all purposes.

FIELD

The present disclosure generally relates to wireless communications. For example, aspects of the present disclosure relate to systems and techniques for managing a key (e.g., key $K_{AUSF}$ associated with the Authentication Server Function (AUSF)), one or more key identifier(s) for the key, and/or one or more counters used to prevent replay attacks (e.g., counter $Counter_{SoR}$ associated with Steering of Roaming (SoR) and/or counter $Counter_{UPU}$ associated with User Equipment (UE) Parameters Update (UPU)).

BACKGROUND

Wireless communications systems are deployed to provide various telecommunications and data services, including telephony, video, data, messaging, and broadcasts. Broadband wireless communications systems have developed through various generations, including a first-generation analog wireless phone service (1G), a second-generation (2G) digital wireless phone service (including interim 2.5G networks), a third-generation (3G) high speed data, Internet-capable wireless device, and a fourth-generation (4G) service (e.g., Long-Term Evolution (LTE), WiMax). Examples of wireless communications systems include code division multiple access (CDMA) systems, time division multiple access (TDMA) systems, frequency division multiple access (FDMA) systems, orthogonal frequency division multiple access (OFDMA) systems, Global System for Mobile communication (GSM) systems, etc. Other wireless communications technologies include 802.11 Wi-Fi, Bluetooth, among others.

A fifth-generation (5G) mobile standard calls for higher data transfer speeds, greater number of connections, and better coverage, among other improvements. The 5G standard (also referred to as "New Radio" or "NR"), according to Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary presents certain concepts relating to one or more aspects relating to the mechanisms disclosed herein in a simplified form to precede the detailed description presented below.

Disclosed are systems, methods, apparatuses, and computer-readable media for performing wireless communications. In one illustrative example, an apparatus for wireless communications is provided that includes at least one memory and at least one processor (e.g., implemented in circuitry) coupled to the at least one memory. The at least one processor is configured to: compare a first key identifier to a second key identifier to identify a mismatch between the first key identifier and the second key identifier, wherein the first key identifier is generated from a key that is stored in a first storage unit of the apparatus, wherein the second key identifier is stored in a second storage unit of the apparatus; and replace, in the second storage unit of the apparatus, the second key identifier based on the mismatch.

In another example, a method for wireless communications is provided. The method comprises: comparing a first key identifier to a second key identifier to identify a mismatch between the first key identifier and the second key identifier, wherein the first key identifier is generated from a key that is stored in a first storage unit of a user equipment (UE), wherein the second key identifier is stored in a second storage unit of the UE; and replacing, in the second storage unit of the UE, the second key identifier based on the mismatch.

As another example, a non-transitory computer-readable medium is provided having stored thereon instructions that, when executed by at least one processor, cause the at least one processor to: compare a first key identifier to a second key identifier to identify a mismatch between the first key identifier and the second key identifier, wherein the first key identifier is generated from a key that is stored in a first storage unit of a user equipment (UE), wherein the second key identifier is stored in a second storage unit of the UE; and replace, in the second storage unit of the UE, the second key identifier based on the mismatch.

In another example, an apparatus for wireless communications is provided. The apparatus comprises: means for comparing a first key identifier to a second key identifier to identify a mismatch between the first key identifier and the second key identifier, wherein the first key identifier is generated from a key that is stored in a first storage unit of the apparatus, wherein the second key identifier is stored in a second storage unit of the apparatus, and replacing, in the second storage unit of the apparatus, the second key identifier based on the mismatch.

In some aspects, one or more of the apparatuses described herein is, is a part of, or includes a mobile device (e.g., a mobile telephone or so-called "smart phone", a tablet computer, or other type of mobile device), a wearable device, an extended reality device (e.g., a virtual reality (VR) device, an augmented reality (AR) device, or a mixed reality (MR) device), a personal computer, a laptop computer, a video server, a television (e.g., a network-connected television), a vehicle (or a computing device or system of a vehicle), or other device. In some aspects, the apparatus includes at least one camera for capturing one or more images or video frames. For example, the apparatus can include a camera (e.g., an RGB camera) or multiple cameras for capturing one or more images and/or one or more videos including video frames. In some aspects, the apparatus includes a display for displaying one or more images, videos, notifications, or other displayable data. In some aspects, the apparatus includes a transmitter configured to transmit one or more video frame and/or syntax data over a transmission medium to at least one device. In some aspects, the processor includes a neural processing unit (NPU), a central processing unit (CPU), a graphics processing unit (GPU), or other processing device or component.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

Other objects and advantages associated with the aspects disclosed herein will be apparent to those skilled in the art based on the accompanying drawings and detailed description.

BRIEF DESCRIPTION OF THE DRAWINGS

Examples of various implementations are described in detail below with reference to the following figures:

FIG. 8 is a flow diagram illustrating an example of a process for wireless communications performed at a network device (e.g., a UE), in accordance with aspects of the present disclosure;

FIG. 9 is a flow diagram illustrating an example of a process for wireless communications performed at a network device (e.g., a UE), in accordance with aspects of the present disclosure;

DETAILED DESCRIPTION

Figure 1:
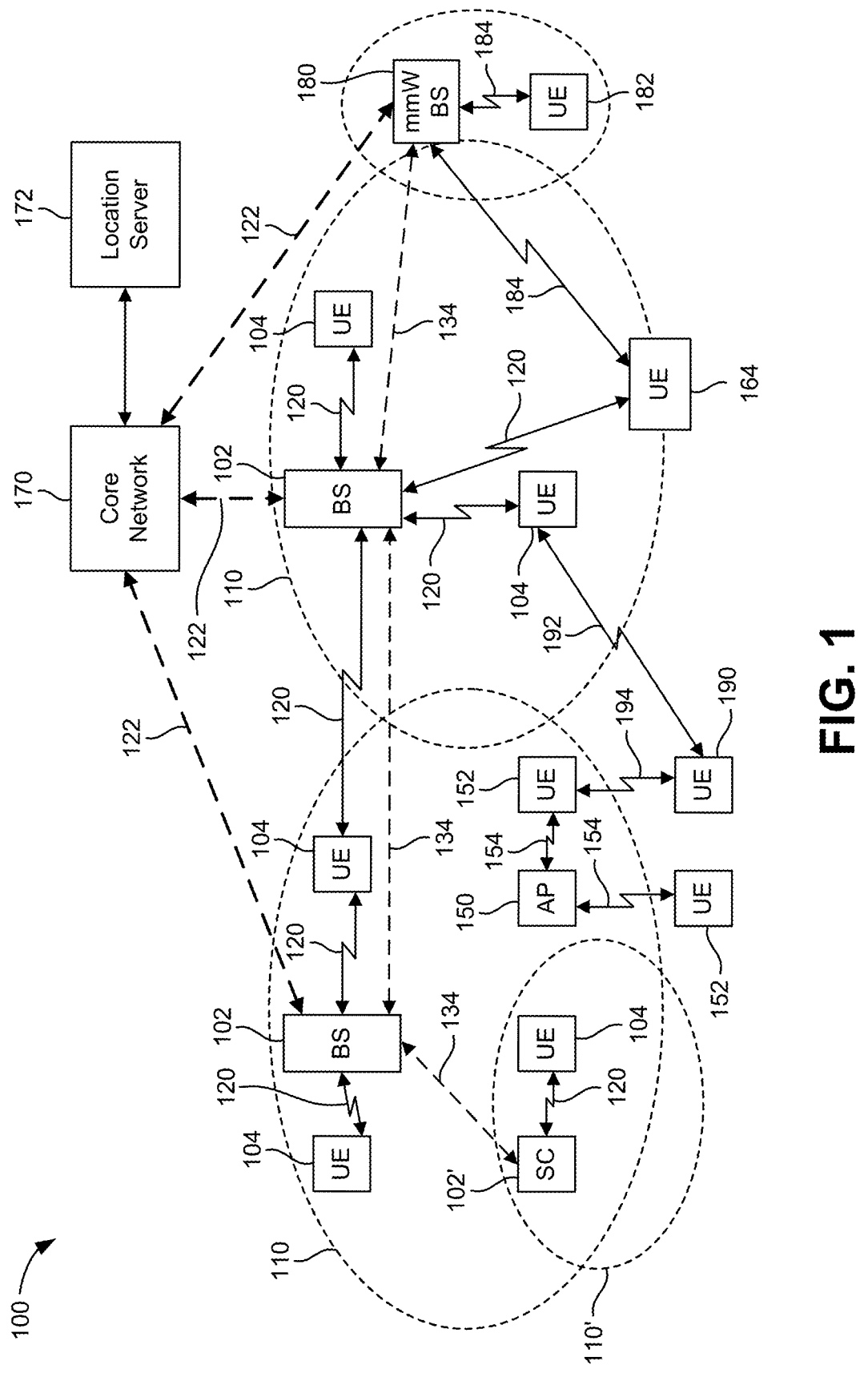
FIG. 1 is a block diagram illustrating an example of a wireless communication network, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

In some cases, a wireless device, such as user equipment (UE), may establish a connection with a wireless network via a network device. A steering of roaming (SoR) procedure allows a network to securely steer a user equipment (UE) that is roaming toward connecting with a Visited Public Land Mobile Network (VPLMN) that is preferred by a Home Public Land Mobile Network (HPLMN). Messages from the network to the UE that are used to perform SoR may include an instance of an SoR counter $Counter_{SoR}$. The UE may store its own instance of the SoR counter $Counter_{SoR}$. To prevent replay attacks, when the UE receives a new SoR message, the UE can compare the SoR counter $Counter_{SoR}$ of the message to the SoR counter $Counter_{SoR}$ of the UE, and can treat the message as valid if the SoR counter $Counter_{SoR}$ of the message is greater than the SoR counter $Counter_{SoR}$ of the UE, and can ignore the message if the SoR counter $Counter_{SoR}$ of the message is less than or equal to the SoR counter $Counter_{SoR}$ of the UE. Sometimes, in situations where a key (e.g., Authentication Server Function (AUSF) key $K_{AUSF}$) is stored in a different storage unit in the UE than the SoR counter $Counter_{SoR}$, the UE can store an incorrect value for the SoR counter $Counter_{SoR}$ that can cause the UE to ignore valid SoR messages. As explained further, this incorrect value of the counter may occur, for instance, if the key (e.g., $K_{AUSF}$) is stored on a removable universal subscriber identity module (USIM).

A UE parameters update (UPU) procedure allows the network to securely (e.g., in an integrity-protected manner) transmit (and in some cases receive) information to the UE, such as an update to UE configuration parameters. According to the 3rd Generation Partnership Project (3GPP), UPU is mandatory to support a Release-15 feature for a fifth-generation (5G)/New Radio (5G/NR) UE. For instance, a home network (e.g., a Unified Data Management (UDM) entity, also referred to as a "UDM") can transmit UPU data (and in some cases other data, such as an acknowledgement indication) for the UE. The UPU data can be transmitted to the UE via one or more other network entities (e.g., an Access and Mobility Management Function (AMF)). Messages from the network to the UE that are used to perform UPU may include an instance of an UPU counter Counter$_{UPU}$. The UE may store its own instance of the UPU counter Counter$_{UPU}$. To prevent replay attacks, when the UE receives a new UPU message, the UE can compare the UPU counter Counter$_{UPU}$ of the message to the UPU counter Counter$_{UPU}$ of the UE, and can treat the message as valid if the UPU counter Counter$_{UPU}$ of the message is greater than the UPU counter Counter$_{UPU}$ of the UE, and can ignore the message if the UPU counter Counter$_{UPU}$ of the message is less than or equal to the UPU counter Counter$_{UPU}$ of the UE. Sometimes, in situations where a key (e.g., Authentication Server Function (AUSF) key $K_{AUSF}$) is stored in a different storage unit in the UE than the UPU counter Counter$_{UPU}$, the UE can store an incorrect value for the UPU counter Counter$_{UPU}$ that can cause the UE to ignore valid UPU messages.

Systems, apparatuses, electronic devices, methods (also referred to as processes), and computer-readable media (collectively referred to herein as "systems and techniques") are described herein for managing keys and counters in wireless communications. In some examples, the systems and techniques systems and techniques are used to manage a key (e.g., key $K_{AUSF}$ associated with the Authentication Server Function (AUSF)), one or more key identifier(s) for the key, and/or one or more counters used to prevent replay attacks (e.g., counter Counter$_{SoR}$ associated with Steering of Roaming (SoR) and/or counter Counter$_{UPU}$ associated with a User Equipment (UE) Parameters Update (UPU)).

For example, a wireless communication device (e.g., a user equipment (UE)) can compare a first key identifier to a second key identifier to identify a mismatch between the first key identifier and the second key identifier. The first key identifier is generated from a key (e.g., Authentication Server Function (AUSF) key $K_{AUSF}$) that is stored in a first storage unit of the UE (e.g., a Universal Subscriber Identity Module (USIM) of the UE). The second key identifier is stored in a second storage unit of the UE (e.g., non-volatile memory (NVM) of a mobile equipment (ME) of the UE). The wireless communication device (e.g., the UE) can replace, in the second storage unit of the UE, the second key identifier based on the mismatch. In a first illustrative example, the wireless communication device (e.g., the UE) replaces the second key identifier with the first key identifier after verifying integrity of a message using the key that is stored in the first storage unit, and updates a counter (for Steering of Roaming (SoR) or UE Parameters Update (UPU)) based on the message. In this way, the counter is updated to a valid value quickly and efficiently, without new primary authentication, and valid messages are not ignored by the UE. In a second illustrative example, the wireless communication device (e.g., the UE) replaces the key with a replacement key, replaces the second key identifier with the third key identifier generated based on the replacement key, and resets at least one counter (e.g., for SoR and/or UPU) to a predetermined value (e.g., zero). In this way, the counter is reset to a valid value and the security keys and context are updated to maximize security, with a new primary authentication, and valid messages are not ignored by the UE.

Additional aspects of the present disclosure are described in more detail below.

Wireless networks are deployed to provide various communication services, such as voice, video, packet data, messaging, broadcast, and the like. A wireless network may support both access links for communication between wireless devices. An access link may refer to any communication link between a client device (e.g., a user equipment (UE), a station (STA), or other client device) and a base station (e.g., a 3GPP gNodeB (gNB) for 5G/NR, a 3GPP eNodeB (eNB) for LTE, a Wi-Fi access point (AP), or other base station) or a component of a disaggregated base station (e.g., a central unit, a distributed unit, and/or a radio unit). In one example, an access link between a UE and a 3GPP gNB may be over a Uu interface. In some cases, an access link may support uplink signaling, downlink signaling, connection procedures, etc.

In some aspects, wireless communications networks may be implemented using one or more modulation schemes. For example, a wireless communication network may be implemented using a quadrature amplitude modulation (QAM) scheme such as 16QAM, 32QAM, 64QAM, etc.

As used herein, the terms "user equipment" (UE) and "network entity" are not intended to be specific or otherwise limited to any particular radio access technology (RAT), unless otherwise noted. In general, a UE may be any wireless communication device (e.g., a mobile phone, router, tablet computer, laptop computer, and/or tracking device, etc.), wearable (e.g., smartwatch, smart-glasses, wearable ring, and/or an extended reality (XR) device such as a virtual reality (VR) headset, an augmented reality (AR) headset or glasses, or a mixed reality (MR) headset), vehicle (e.g., automobile, motorcycle, bicycle, etc.), and/or Internet of Things (IoT) device, etc., used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs may communicate with a core network via a RAN, and through the core network the UEs may be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11 communication standards, etc.) and so on.

A network entity may be implemented in an aggregated or monolithic base station architecture, or alternatively, in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. A base station (e.g., with an aggregated/monolithic base station architecture or disaggregated base station architecture) may operate according to one of several RATs in communication with UEs depending on the network on which it is deployed, and may be alternatively referred to as an access point (AP), a network node, a NodeB (NB), an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems, a base station may provide edge node signaling functions while in other systems it may provide additional control and/or network management functions. A communication link through which UEs may send signals to a base station is called an uplink (UL) channel (e.g., a reverse traffic channel, a reverse control channel, an access channel, etc.). A communication link through which the base station may send signals to UEs is called a downlink (DL) or forward link channel (e.g., a paging channel, a control channel, a broadcast channel, or a forward traffic channel, etc.). The term traffic channel (TCH), as used herein, may refer to either an uplink, reverse or downlink, and/or a forward traffic channel.

The term "network entity" or "base station" (e.g., with an aggregated/monolithic base station architecture or disaggregated base station architecture) may refer to a single physical transmit receive point (TRP) or to multiple physical TRPs that may or may not be co-located. For example, where the term "network entity" or "base station" refers to a single physical TRP, the physical TRP may be an antenna of the base station corresponding to a cell (or several cell sectors) of the base station. Where the term "network entity" or "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a network entity or base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An RF signal comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

Various aspects of the systems and techniques described herein will be discussed below with respect to the figures. According to various aspects, FIG. 1 illustrates an example of a wireless communications system 100. The wireless communications system 100 (which may also be referred to as a wireless wide area network (WWAN)) may include various base stations 102 and various UEs 104. In some aspects, the base stations 102 may also be referred to as "network entities" or "network nodes." One or more of the base stations 102 may be implemented in an aggregated or monolithic base station architecture. Additionally, or alternatively, one or more of the base stations 102 may be implemented in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to a long term evolution (LTE) network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC or 5GC) over backhaul links 134, which may be wired and/or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency may be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a WLAN AP 150 in communication with WLAN stations (STAs) (e.g., UE 152) via communication links 154 in an unlicensed frequency spectrum (e.g., 5 Gigahertz (GHz)). When communicating in an unlicensed frequency spectrum, the WLAN STAs (e.g., UE 152) and/or the WLAN AP 150 may perform a clear channel assessment (CCA) or listen before talk (LBT) procedure prior to communicating in order to determine whether the channel is available. In some examples, the wireless communications system 100 may include devices (e.g., UEs, etc.) that communicate with one or more UEs 104, base stations 102, APs 150, etc. utilizing the ultra-wideband (UWB) spectrum. The UWB spectrum may range from 3.1 to 10.5 GHz.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE and/or 5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. The mmW base station 180 may be implemented in an aggregated or monolithic base station architecture, or alternatively, in a disaggregated base station architecture (e.g., including one or more of a CU, a DU, a RU, a Near-RT RIC, or a Non-RT RIC). Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW and/or near mmW radio frequency band have high path loss and a relatively short range. The mmW base station 180 and the UE 182 may utilize beamforming (transmit and/or receive) over an mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

In some aspects relating to 5G, the frequency spectrum in which wireless network nodes or entities (e.g., base stations 102/180, UEs 104/182) operate is divided into multiple frequency ranges, FR1 (from 450 to 6000 Megahertz (MHz)), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency and/or component carrier over which some base station is communicating, the term "cell," "serving cell," "component carrier," "carrier frequency," and the like may be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). In carrier aggregation, the base stations 102 and/or the UEs 104 may use spectrum up to Y MHz (e.g., 5, 10, 15, 20, 100 MHz) bandwidth per carrier up to a total of Yx MHz (x component carriers) for transmission in each direction. The component carriers may or may not be adjacent to each other on the frequency spectrum. Allocation of carriers may be asymmetric with respect to the downlink and uplink (e.g., more or less carriers may be allocated for downlink than for uplink). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

In order to operate on multiple carrier frequencies, a base station 102 and/or a UE 104 may be equipped with multiple receivers and/or transmitters. For example, a UE 104 may have two receivers, "Receiver 1" and "Receiver 2," where "Receiver 1" is a multi-band receiver that may be tuned to band (i.e., carrier frequency) 'X' or band 'Y,' and "Receiver 2" is a one-band receiver tuneable to band 'Z' only. In this example, if the UE 104 is being served in band 'X,' band 'X' would be referred to as the PCell or the active carrier frequency, and "Receiver 1" would need to tune from band 'X' to band 'Y' (an SCell) in order to measure band 'Y' (and vice versa). In contrast, whether the UE 104 is being served in band 'X' or band 'Y,' because of the separate "Receiver 2," the UE 104 may measure band 'Z' without interrupting the service on band 'X' or band 'Y.'

The wireless communications system 100 may further include a UE 164 that may communicate with a macro cell base station 102 over a communication link 120 and/or the mmW base station 180 over an mmW communication link 184. For example, the macro cell base station 102 may support a PCell and one or more SCells for the UE 164 and the mmW base station 180 may support one or more SCells for the UE 164.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA (e.g., UE 152) connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), Wi-Fi Direct (Wi-Fi-D), Bluetooth®, and so on.

Figure 2:
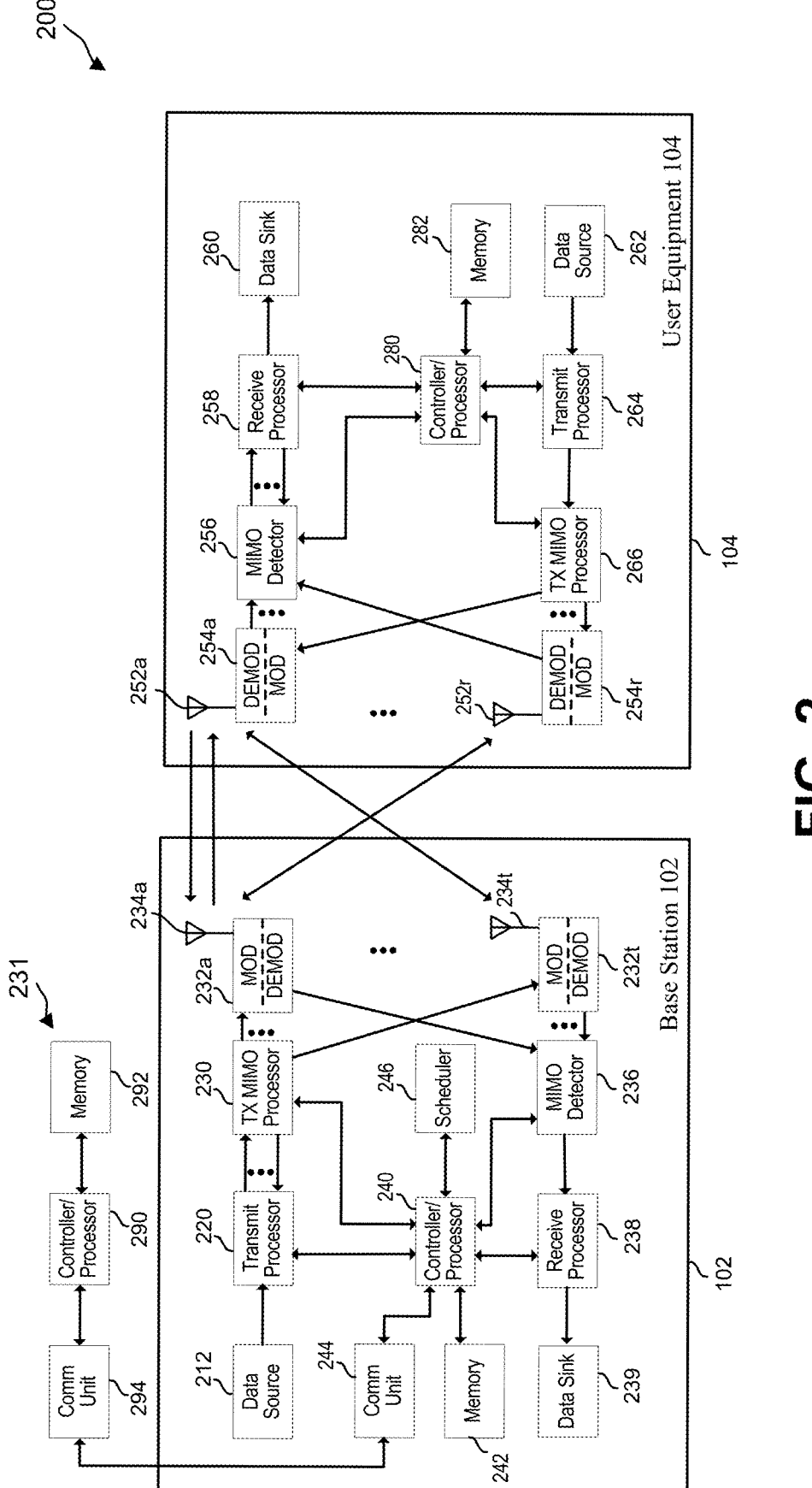
FIG. 2 is a diagram illustrating a design of a base station and a User Equipment (UE) device that enable transmission and processing of signals exchanged between the UE and the base station, in accordance with some examples.

FIG. 2 shows a block diagram of a design 200 of a base station 102 and a UE 104 that enable transmission and processing of signals exchanged between the UE and the base station, in accordance with some aspects of the present disclosure. Design 200 includes components of a base station 102 and a UE 104, which may be one of the base stations 102 and one of the UEs 104 in FIG. 1. Base station 102 may be equipped with T antennas 234a through 234t, and UE 104 may be equipped with R antennas 252a through 252r, where in general T≥1 and R≥1.

At base station 102, a transmit processor 220 may receive data from a data source 212 for one or more UEs, select one or more modulation and coding schemes (MCS) for each UE based at least in part on channel quality indicators (CQIs)

received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. The modulators 232a through 232t are shown as a combined modulator-demodulator (MOD-DEMOD). In some cases, the modulators and demodulators may be separate components. Each modulator of the modulators 232a to 232t may process a respective output symbol stream, e.g., for an orthogonal frequency-division multiplexing (OFDM) scheme and/or the like, to obtain an output sample stream. Each modulator of the modulators 232a to 232t may further process (e.g., convert to analog, amplify, filter, and upconvert) the output sample stream to obtain a downlink signal. T downlink signals may be transmitted from modulators 232a to 232t via T antennas 234a through 234t, respectively. According to certain aspects described in more detail below, the synchronization signals may be generated with location encoding to convey additional information.

At UE 104, antennas 252a through 252r may receive the downlink signals from base station 102 and/or other base stations and may provide received signals to demodulators (DEMODs) 254a through 254r, respectively. The demodulators 254a through 254r are shown as a combined modulator-demodulator (MOD-DEMOD). In some cases, the modulators and demodulators may be separate components. Each demodulator of the demodulators 254a through 254r may condition (e.g., filter, amplify, downconvert, and digitize) a received signal to obtain input samples. Each demodulator of the demodulators 254a through 254r may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 104 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 104, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals (e.g., based at least in part on a beta value or a set of beta values associated with the one or more reference signals). The symbols from transmit processor 264 may be precoded by a TX-MIMO processor 266 if application, further processed by demodulators 254a through 254r (e.g., acting as modulators) (e.g., for DFT-s-OFDM, CP-OFDM, and/or the like), and transmitted to base station 102. At base station 102, the uplink signals from UE 104 and other UEs may be received by antennas 234a through 234t, processed by modulators 232a through 232t (e.g., acting as demodulators), detected by a MIMO detector 236 if applicable, and further processed by a receive processor 238 to obtain decoded data and control information sent by UE 104. Receive processor 238 may provide the decoded data to a data sink 239 and the decoded control information to controller (processor) 240. Base station 102 may include communication unit 244 and communicate to a network controller 231 via communication unit 244. Network controller 231 may include communication unit 294, controller/processor 290, and memory 292.

In some aspects, one or more components of UE 104 may be included in a housing. Controller 240 of base station 102, controller/processor 280 of UE 104, and/or any other component(s) of FIG. 2 may perform one or more techniques associated with implicit UCI beta value determination for NR.

Memories 242 and 282 may store data and program codes for the base station 102 and the UE 104, respectively. A scheduler 246 may schedule UEs for data transmission on the downlink, uplink, and/or sidelink.

In some aspects, deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also may be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which may enable flexibility in network design. The various units of the disaggregated base station, or disaggregated RAN architecture, may be configured for wired or wireless communication with at least one other unit.

Figure 3:
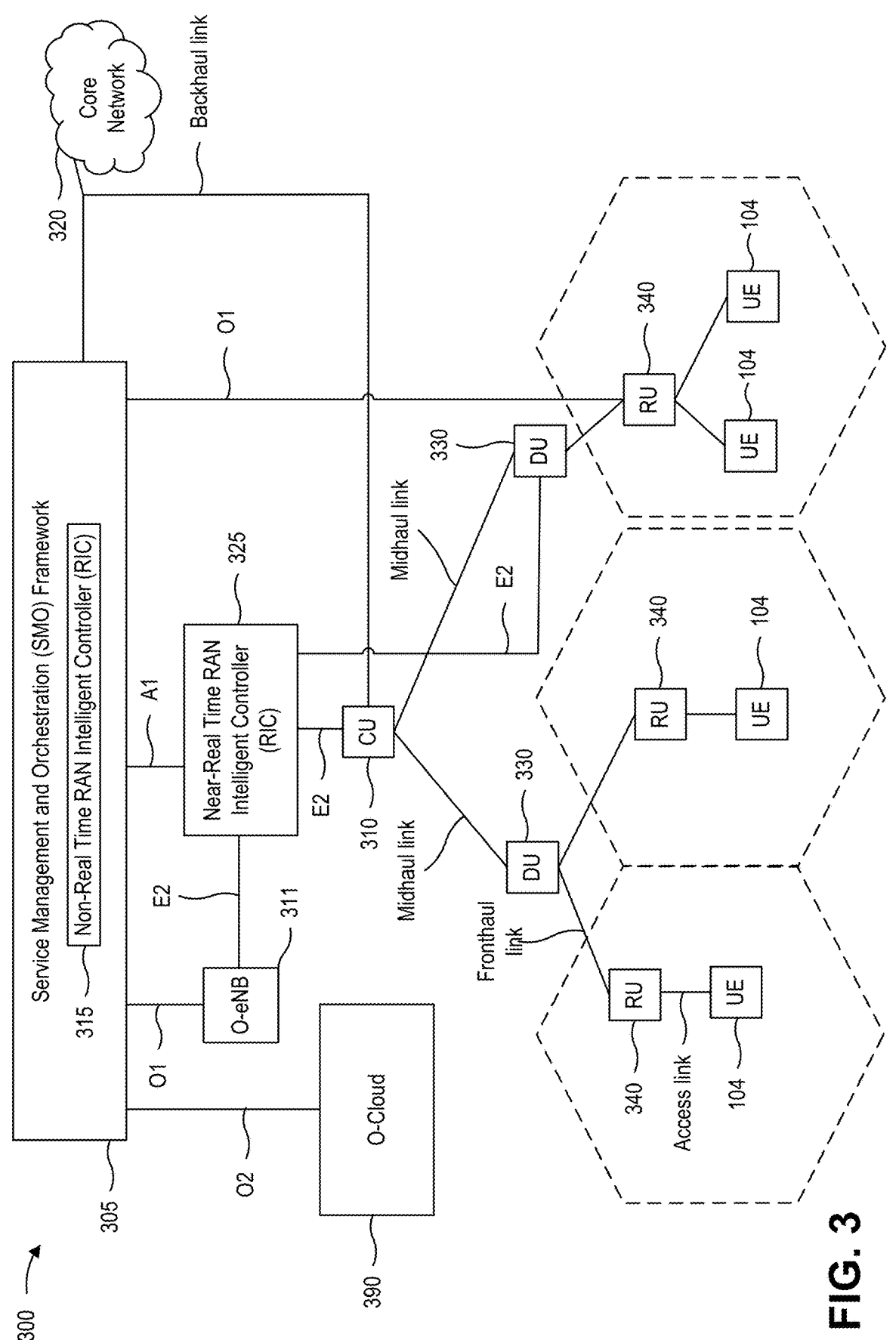
FIG. 3 is a diagram illustrating an example of a disaggregated base station, in accordance with some examples.

FIG. 3 shows a diagram illustrating an example disaggregated base station 300 architecture. The disaggregated base station 300 architecture may include one or more central units (CUs) 310 that may communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 104 via one or more radio frequency (RF) access links. In some implementations, the UE 104 may be simultaneously served by multiple RUs 340.

Each of the units, e.g., the CUs 310, the DUs 330, the RUs 340, as well as the Near-RT RICs 325, the Non-RT RICs 315 and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, may be configured to communicate with one or more of the other units via the transmission medium. For example, the units may include a wired interface configured to receive or transmit signals over a wired transmission medium to one or more of the other units. Additionally, the units may include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions may include radio resource control (RRC), packet data convergence protocol (PDCP), service data adaptation protocol (SDAP), or the like. Each control function may be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 may be logically split into one or more CU-UP units and one or more CU-CP units. The CU-UP unit may communicate bidirectionally with the CU-CP unit via an interface, such as the E1 interface when implemented in an O-RAN configuration. The CU 310 may be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 330 may further host one or more low PHY layers. Each layer (or module) may be implemented with an interface configured to communicate signals with other layers (and modules) hosted by the DU 330, or with the control functions hosted by the CU 310.

Lower-layer functionality may be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 may be implemented to handle over the air (OTA) communication with one or more UEs 104. In some implementations, real-time and non-real-time aspects of control and user plane communication with the RU(s) 340 may be controlled by the corresponding DU 330. In some scenarios, this configuration may enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an (2 interface). Such virtualized network elements may include, but are not limited to, CUs 310, DUs 330, RUs 340 and Near-RT RICs 325. In some implementations, the SMO Framework 305 may communicate with a hardware aspect of a 4G RAN, such as an open eNB (O-eNB) 311, via an O1 interface. Additionally, in some implementations, the SMO Framework 305 may communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

Figure 4:
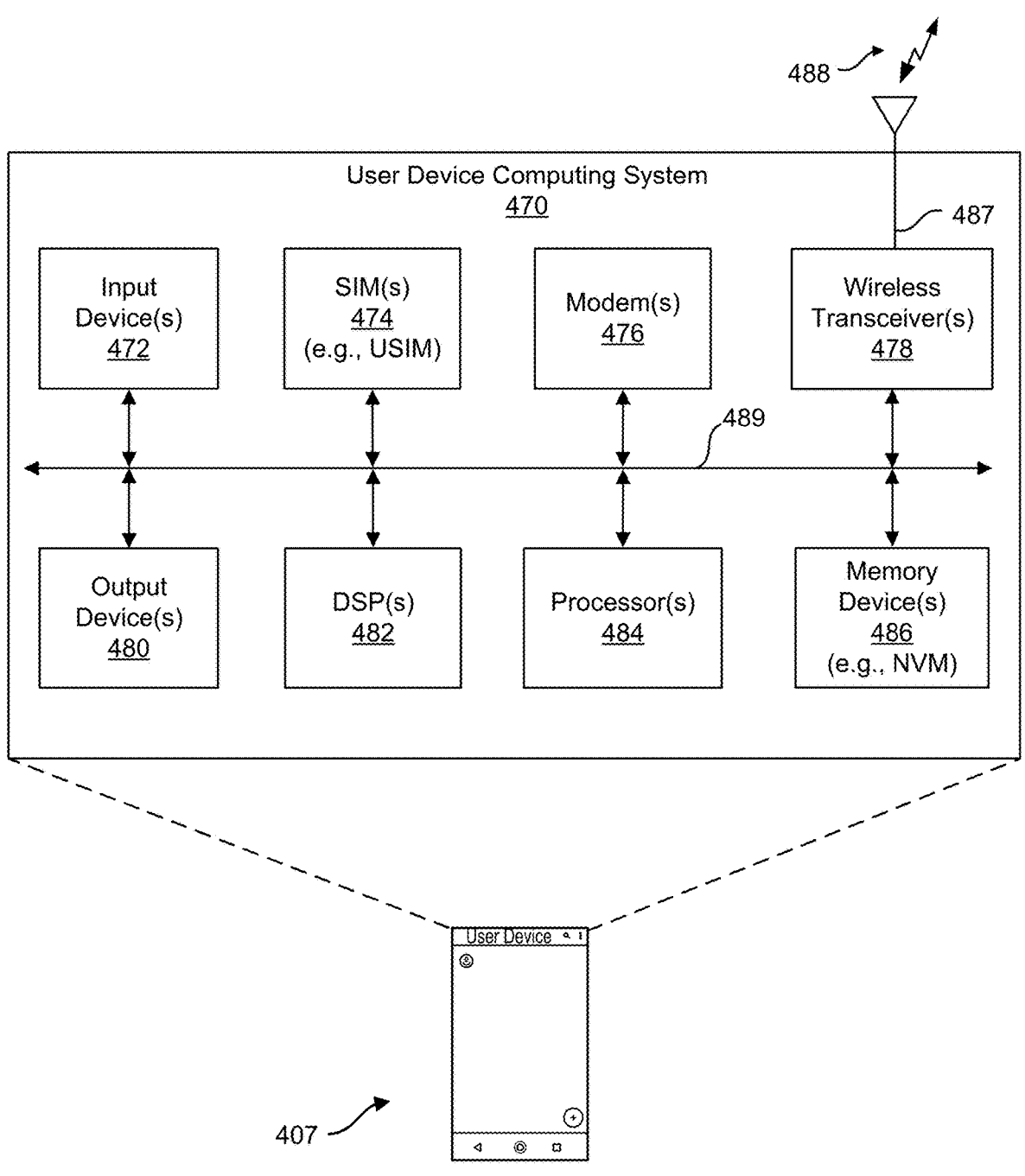
FIG. 4 is a block diagram illustrating components of a user equipment, in accordance with some examples.

FIG. 4 illustrates an example of a computing system 470 of a wireless device 407. The wireless device 407 may include a client device such as a UE (e.g., UE 104, UE 152, UE 190) or other type of device (e.g., a station (STA) configured to communication using a Wi-Fi interface) that may be used by an end-user. For example, the wireless device 407 may include a mobile phone, router, tablet computer, laptop computer, tracking device, wearable device (e.g., a smart watch, glasses, an extended reality (XR) device such as a virtual reality (VR), augmented reality (AR) or mixed reality (MR) device, etc.), Internet of Things (IoT) device, access point, and/or another device that is configured to communicate over a wireless communications network. The computing system 470 includes software and hardware components that may be electrically or communicatively coupled via a bus 489 (or may otherwise be in communication, as appropriate). For example, the computing system 470 includes one or more processors 484. The one or more processors 484 may include one or more CPUs, ASICs, FPGAs, APs, GPUs, VPUs, NSPs, microcontrollers, dedicated hardware, any combination thereof, and/or other processing device or system. The bus 489 may be used by the one or more processors 484 to communicate between cores and/or with the one or more memory devices 486.

The computing system 470 may also include one or more memory devices 486, one or more digital signal processors (DSPs) 482, one or more subscriber identity modules (SIMs) 474 that might be removable, one or more modems 476, one or more wireless transceivers 478, one or more antennas 487, one or more input devices 472 (e.g., a camera, a mouse, a keyboard, a touch sensitive screen, a touch pad, a keypad, a microphone, and/or the like), and one or more output devices 480 (e.g., a display, a speaker, a printer, and/or the like).

In some aspects, computing system 470 may include one or more radio frequency (RF) interfaces configured to transmit and/or receive RF signals. In some examples, an RF interface may include components such as modem(s) 476, wireless transceiver(s) 478, and/or antennas 487. The one or more wireless transceivers 478 may transmit and receive wireless signals (e.g., signal 488) via antenna 487 from one or more other devices, such as other wireless devices, network devices (e.g., base stations such as eNBs and/or gNBs, Wi-Fi access points (APs) such as routers, range extenders or the like, etc.), cloud networks, and/or the like. In some examples, the computing system 470 may include multiple antennas or an antenna array that may facilitate simultaneous transmit and receive functionality. Antenna 487 may be an omnidirectional antenna such that radio frequency (RF) signals may be received from and transmitted in all directions. The wireless signal 488 may be transmitted via a wireless network. The wireless network may be any wireless network, such as a cellular or telecommunications network (e.g., 3G, 4G, 5G, etc.), wireless local area network (e.g., a Wi-Fi network), a Bluetooth™ network, and/or other network.

In some examples, the wireless signal 488 may be transmitted directly to other wireless devices using sidelink communications (e.g., using a PC5 interface, using a DSRC interface, etc.). Wireless transceivers 478 may be configured to transmit RF signals for performing sidelink communications via antenna 487 in accordance with one or more transmit power parameters that may be associated with one or more regulation modes. Wireless transceivers 478 may also be configured to receive sidelink communication signals having different signal parameters from other wireless devices.

In some examples, the one or more wireless transceivers 478 may include an RF front end including one or more components, such as an amplifier, a mixer (also referred to as a signal multiplier) for signal down conversion, a frequency synthesizer (also referred to as an oscillator) that provides signals to the mixer, a baseband filter, an analog-to-digital converter (ADC), one or more power amplifiers, among other components. The RF front-end may generally handle selection and conversion of the wireless signals 488 into a baseband or intermediate frequency and may convert the RF signals to the digital domain.

In some cases, the computing system 470 may include a coding-decoding device (or CODEC) configured to encode and/or decode data transmitted and/or received using the one or more wireless transceivers 478. In some cases, the computing system 470 may include an encryption-decryption device or component configured to encrypt and/or decrypt data (e.g., according to the AES and/or DES standard) transmitted and/or received by the one or more wireless transceivers 478.

The one or more SIMs 474 may each securely store an international mobile subscriber identity (IMSI) number and related key assigned to the user of the wireless device 407. The IMSI and key may be used to identify and authenticate the subscriber when accessing a network provided by a network service provider or operator associated with the one or more SIMs 474. The one or more modems 476 may modulate one or more signals to encode information for transmission using the one or more wireless transceivers 478. The one or more modems 476 may also demodulate signals received by the one or more wireless transceivers 478 in order to decode the transmitted information. In some examples, the one or more modems 476 may include a Wi-Fi modem, a 4G (or LTE) modem, a 5G (or NR) modem, and/or other types of modems. The one or more modems 476 and the one or more wireless transceivers 478 may be used for communicating data for the one or more SIMs 474.

The computing system 470 may also include (and/or be in communication with) one or more non-transitory machine-readable storage media or storage devices (e.g., one or more memory devices 486), which may include, without limitation, local and/or network accessible storage, a disk drive, a drive array, an optical storage device, a solid-state storage device such as a RAM and/or a ROM, which may be programmable, flash-updateable and/or the like. Such storage devices may be configured to implement any appropriate data storage, including without limitation, various file systems, database structures, and/or the like.

In various embodiments, functions may be stored as one or more computer-program products (e.g., instructions or code) in memory device(s) 486 and executed by the one or more processor(s) 484 and/or the one or more DSPs 482. The computing system 470 may also include software elements (e.g., located within the one or more memory devices 486), including, for example, an operating system, device drivers, executable libraries, and/or other code, such as one or more application programs, which may comprise computer programs implementing the functions provided by various embodiments, and/or may be designed to implement methods and/or configure systems, as described herein.

FIGS. 5A-5D depict various example aspects of data structures for a wireless communication system, such as wireless communication system 100 of FIG. 1. FIGS.

Figure 5:
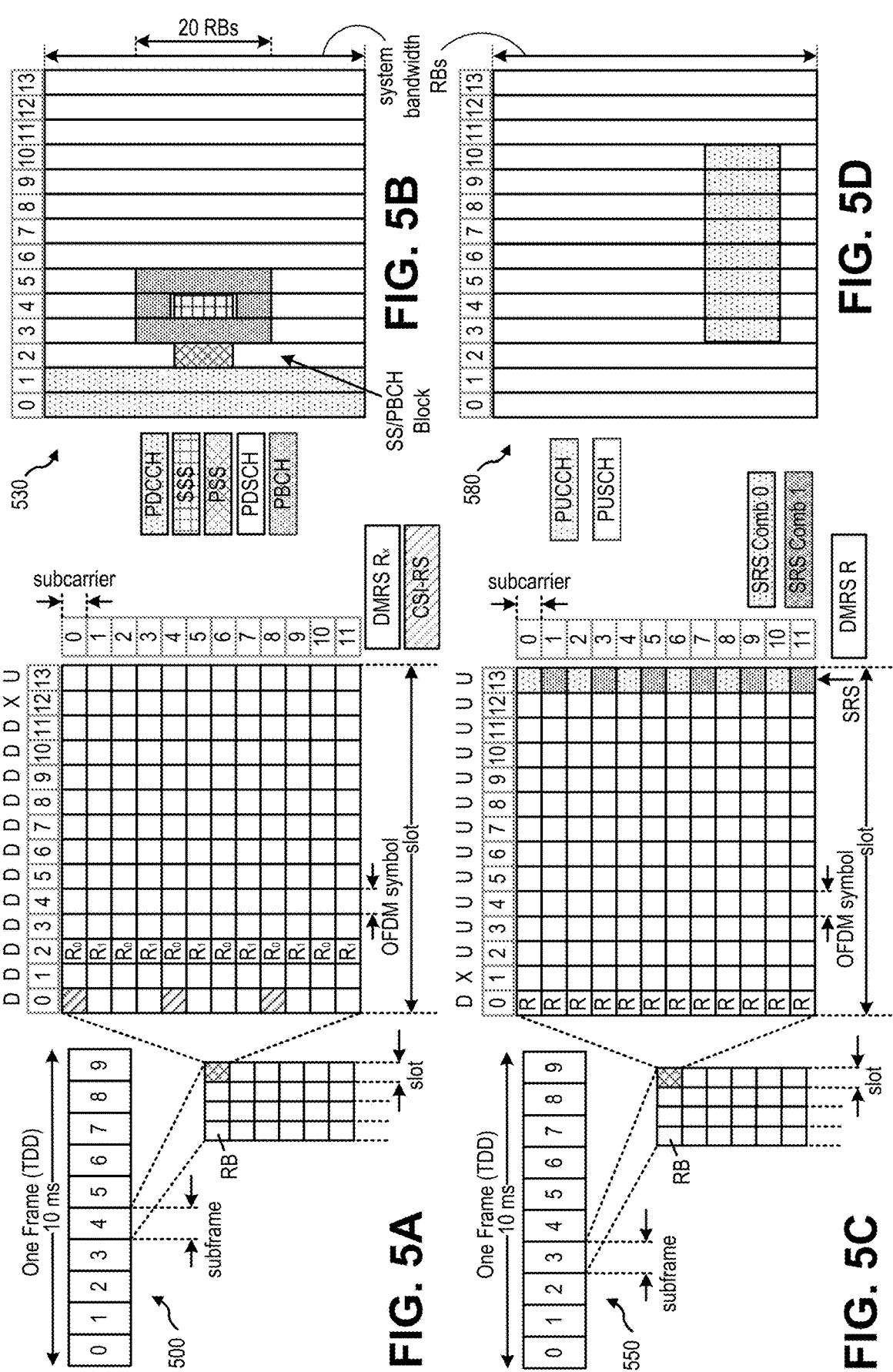
FIGS. 5A-5D depict various example aspects of data structures for a wireless communication network, in accordance with some examples.

5A-5D depict aspects of data structures for a wireless communication network, such as wireless communication system 100 of FIG. 1. In particular, FIG. 5A is a diagram 500 illustrating an example of a first subframe within a 5G (e.g., 5G NR) frame structure, FIG. 5B is a diagram 530 illustrating an example of DL channels within a 5G subframe, FIG. 5C is a diagram 550 illustrating an example of a second subframe within a 5G frame structure, and FIG. 5D is a diagram 580 illustrating an example of UL channels within a 5G subframe.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 5A and 5C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology p, there are 14 symbols/slot and $2\mu$ slots/subframe. The subcarrier spacing and symbol length/duration are a function of the numerology. The subcarrier spacing may be equal to $2^{\mu} \cdot 15$ kHz, where $\mu$ is the numerology 0 to 5. As such, the numerology $\mu$=0 has a subcarrier spacing of 15 kHz and the numerology $\mu$=5 has a subcarrier spacing of 480 kHz. The symbol length/duration is inversely related to the subcarrier spacing. FIGS. 5A-5D provide an example of slot configuration 0 with 14 symbols per slot and numerology $\mu$=2 with 4 slots per subframe. The slot duration is 0.25 ms, the subcarrier spacing is 60 kHz, and the symbol duration is approximately 16.67 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 5A, some of the REs carry reference (pilot) signals (RS) for a UE (e.g., UE 104, UE 152, UE 190). The RS may include demodulation RS (DM-RS) (indicated as Rx for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 5B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., UE 104, UE 152, UE 190) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 5C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 5D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Steering of roaming (SoR) allows a network to securely steer a user equipment (UE) that is roaming toward connecting with a Visited Public Land Mobile Network (VPLMN) that is preferred by a Home Public Land Mobile Network (HPLMN).

A UE parameters update (UPU) allows a network to securely (e.g., in an integrity-protected manner) transmit and/or receive information to/from a UE, such as to transmit to the UE an update to UE configuration parameters. UPU is mandatory to support a 3GPP Release-15 feature for a 5G/NR UE.

Figure 6:
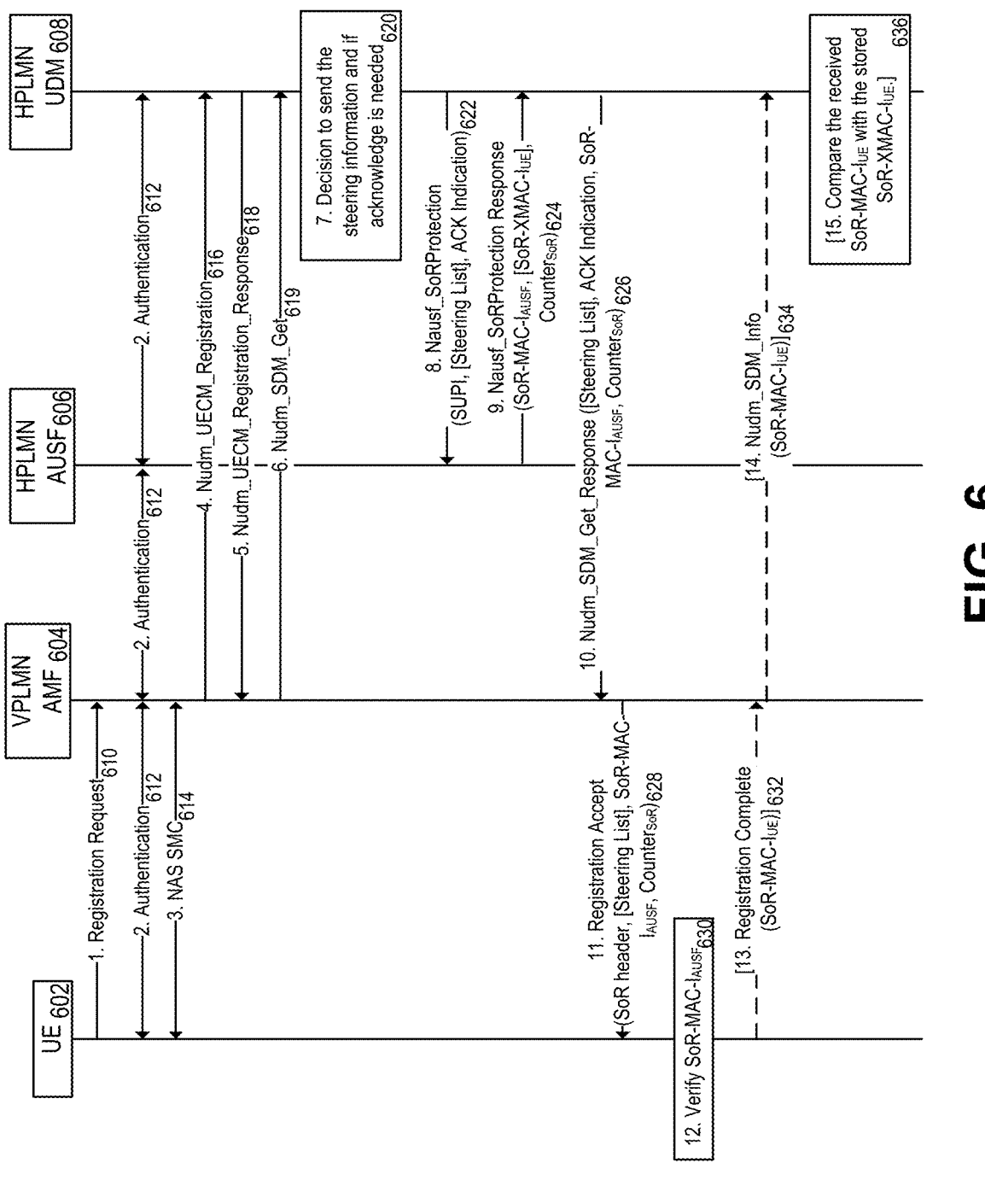
FIG. 6 is a swim lane diagram illustrating an example of a security procedure for steering a user equipment (UE) in a Visited Public Land Mobile Network (VPLMN) during registration, in accordance with aspects of the present disclosure.

FIG. 6 is a swim lane diagram illustrating an example of a security procedure 600 for steering a user equipment (UE) in a Visited Public Land Mobile Network (VPLMN) during registration. The security procedure 600 is described in the context of functions supporting a control plane solution for steering of roaming (SoR) in mobile network systems, such as 5G systems. SoR can be used by a Home Public Land Mobile Network (HPLMN) to securely steer a UE toward a preferred Visitor Public Land Mobile Network (VPLMN), for instance while the UE is roaming. SoR involves a UE 602, a Visitor Public Land Mobile Network (VPLMN) Access and Mobility Management Function (AMF) 604, a Home Public Land Mobile Network (HPLMN) Authentication Server Function (AUSF) 606, and a HPLMN Unified Data Management (UDM) 608. In some versions of 5G standards, SoR may be a mandatory feature to support.

In an illustrative example of the security procedure 600 for SoR, the UE 602 initiates registration by sending a Registration Request 610 message to the VPLMN AMF 604. The VPLMN AMF 604 executes a registration procedure, for instance by executing primary authentication 612 of the UE 602 and then initiating a Non-Access Stratum (NAS) Security Mode Control (SMC) 614 procedure after the authentication 612 is successful. The VPLMN AMF 604 invokes a Nudm_UECM_Registration 616 message to the UDM 608 and registers access with the HPLMN UDM 608, receiving a Nudm_UECM_Registration_Response 618 from the HPLMN UDM 608. The VPLMN AMF 604 invokes a Nudm_SDM_Get 619 service operation message to the HPLMN UDM 608 to get amongst other information the Access and Mobility Subscription data for the UE 602.

The HPLMN UDM 608 decides to send the Steering of Roaming (SoR) Information 620, and obtains a list of preferred PLMN(s) for roaming and/or access technology combinations. In some examples, the SOR information 620 and/or the list of preferred PLMN(s) can be send and/or obtained via one or more secured packet(s) (e.g., a secure packet list). In some examples, the secured packet list may include encrypted packets that identify the SOR information 620, the list of preferred PLMN(s), and/or the access technology combinations. If the HPLMN UDM 608 determines that the UE 602 is configured to not expect to receive Steering of Roaming Information at initial registration and if the HPLMN UDM 608 determines that no change of the "Operator Controlled PLMN Selector with Access Technology" list stored in the UE is needed, then the HPLMN UDM 608 may not piggyback Steering of Roaming Information at all in the Nudm_SDM_Get 619 response and hence the following steps are omitted.

The HPLMN UDM 608 invokes the Nausf_SoRProtection 622 service operation message to the HPLMN AUSF 606 to get SoR-MAC-I$_{AUSF}$ and a SoR counter Counter$_{SoR}$ in a Nausf_SoRProtection Response 624. If the HPLMN decides that the UE 602 is to acknowledge the successful security check of the received Steering of Roaming Information, then the HPLMN UDM 608 accordingly sets the ACK Indication included in the Nausf_SoRProtection 622 service operation message to signal that it also needs an expected SoR-XMAC-I$_{UE}$. The SoR-XMAC-I$_{UE}$ is a security element used in the SoR mechanism to ensure the integrity of SOR information 620 transmitted between the HPLMN and the UE. In some examples, SoR-XMAC-I$_{UE}$ is a Message Authentication Code (MAC) that can be used to verify the authenticity and integrity of the SOR information 620, protecting the SOR information 620 from tampering or unauthorized modifications. In some examples, SoR-XMAC-I$_{UE}$ is derived using the key K$_{AUSF}$, the counter Counter$_{SoR}$, or a combination thereof.

At reception of the Nausf_SoRProtection_Protect 622 request from the HPLMN UDM 608, the HPLMN AUSF 606 constructs the SOR header based on the information received from the HPLMN UDM 608, (such as an ACK Indication, a list of preferred PLMN and/or access technology combinations, and/or a secured packet). The SoR counter Counter$_{SoR}$ is used to protect against, and/or prevent, replay attacks. The inclusion of the Steering List and the SoR header in the calculation of SoR-MAC-I$_{AUSF}$ allows the UE 602 to verify that the received Steering of Roaming Information is not tampered with or removed by the VPLMN. The expected SoR-XMAC-I$_{UE}$ allows the HPLMN UDM 608 to verify that the UE 602 received the Steering of Roaming Information.

The HPLMN UDM 608 responds to the Nudm_SDM_Get 619 service operation to the VPLMN AMF 604 using a Nudm_SDM_Get_Response 626, which includes the ACK Indication, the list of preferred PLMN and/or access technology combinations, and/or the secured packet, with SoR-MAC-I$_{AUSF}$ and Counter$_{SoR}$ within the Access and Mobility Subscription data. If the HPLMN UDM 608 requests an acknowledgement, it can temporarily store the expected SoR-XMAC-I$_{UE}$.

The VPLMN AMF 604 constructs the SOR header based on the ACK Indication and the list of preferred PLMN and/or access technology combinations or secured packet received from the HPLMN UDM 608 and include it in an SOR transparent container. The SOR transparent container can refer to a data structure used in the SOR mechanism to encapsulate SOR information 620 in a way that preserves the integrity and confidentiality of the SOR information 620 but provides transparency (e.g., access to the SOR information 620) to the UE 602, the VPLMN AMF 604, the HPLMN AUSF 606, the HPLMN UDM 608, and/or other network entities. The resulting Steering of Roaming Information, also including SoR-MAC-I$_{AUSF}$ and Counter$_{SoR}$ (both also received from the UDM), is conveyed to the UE 602 in the Registration Accept 628 message.

On receiving the Registration Accept 628 message with Steering of Roaming Information, the UE 602 calculates the SoR-MAC-I$_{AUSF}$ in the same way as the HPLMN AUSF 606 on the received Steering of Roaming Information, including the Counter$_{SoR}$ and the SoR header, and verifies 630 whether it matches the SoR-MAC-I$_{AUSF}$ value received in the Registration Accept 628 message. If the HPLMN UDM 608 has requested an acknowledgement from the UE and the UE 602 verified that the Steering of Roaming Information received in step 11 has been provided by the HPLMN, then the UE shall send the Registration Complete message to the serving VPLMN AMF 604. The UE 602 generates the SoR-MAC-I$_{UE}$ and includes the generated SoR-MAC-I$_{UE}$ in a SOR transparent container in the Registration Complete 632 message. The VPLMN AMF 604 sends a Nudm_SDM_Info 634 request message to the HPLMN UDM 608. If a transparent container with the SoR-MAC-I$_{UE}$ was received in the Registration Complete 632 message, the VPLMN AMF 604 includes the SoR-MAC-I$_{UE}$ in the Nudm_SDM_Info 634 request message. If the HPLMN indicates that the UE 602 is to acknowledge the successful security check of the received Steering of Roaming Information (e.g., at the sending of the Nudm_SMD_Get_Response 626), then the HPLMN UDM 608 compares 636 the received SoR-MAC-I$_{UE}$ with the expected SoR-XMAC-I$_{UE}$ that the HPLMN UDM 608 stored temporarily (e.g., at the sending of the Nudm_SMD_Get_Response 626).

Figure 7:
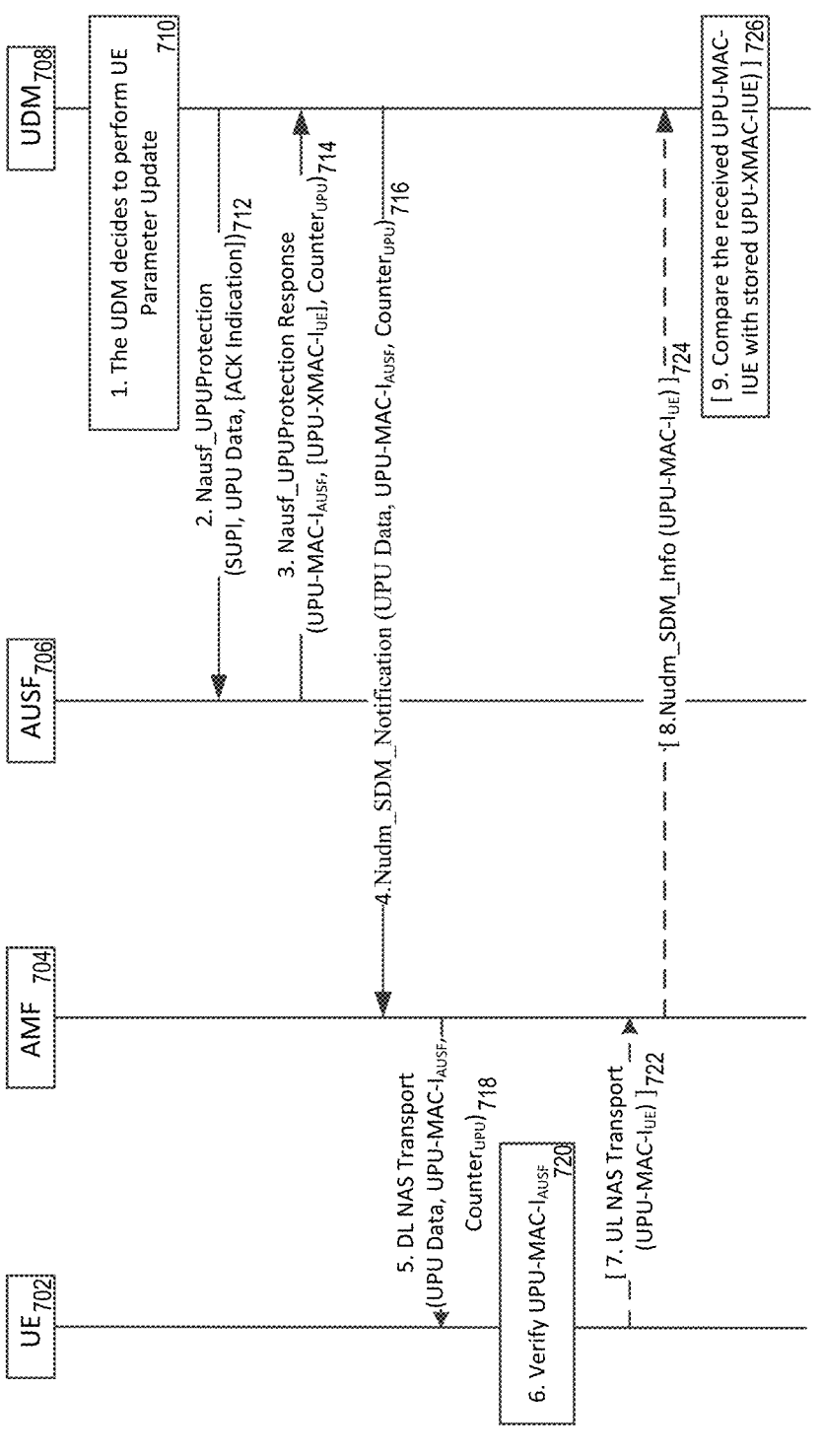
FIG. 7 is a swim lane diagram illustrating an example of a security procedure for updating user equipment (UE) parameters, in accordance with aspects of the present disclosure.

FIG. 7 is a swim lane diagram illustrating an example of a security procedure 700 for updating user equipment (UE) parameters. The security procedure 700 is associated with UE Parameters Update (UPU) procedure. In some examples, a UDM may decide to perform a UE parameters update (UPU) any time after a UE 702 has been successfully authenticated and registered to the 5G system. The security procedure 700 may involve the UE 702, an AMF 704, an AUSF 706, and a UDM 708. In some aspects, the UE 702 is an example of the UE 602. In some aspects, the AMF 704 is an example of the VPLMN AMF 604. In some aspects, the AUSF 706 is an example of the HPLMN AUSF 606. In some aspects, the UDM 708 is an example of the HPLMN UDM 608.

In some examples, the term UE (e.g., the UE 702) can refer to a mobile equipment (ME) with a Subscriber Identity Module (SIM) (e.g., a Universal Subscriber Identity Module (USIM)) such as the SIM 474 as shown with respect to FIG. 4. In some examples, the term ME can refer to a UE separately from the Subscriber Identity Module (SIM) (e.g., Universal Subscriber Identity Module (USIM)). In some examples, the terms UE and ME are used interchangeably.

In an illustrative example, the UDM 708 decides to perform the UE Parameters Update (UPU) 710 using a control plane procedure while the UE 702 is registered to the 5G system. In some examples, the UE parameters to be updated can include parameters associated with the steering of roaming (SoR) information (e.g., SOR information 620). If the final consumer of any of the UE parameters to be updated (e.g., the updated Routing ID Data) is the Universal Subscriber Identity Module (USIM), the UDM 708 protects these parameters using a secured packet mechanism to update the parameters stored on the USIM. The UDM 708 prepares the UE Parameters Update Data (UPU Data) by including (in the UPU data) parameters protected by the secured packet mechanism, if any, as well as any UE parameters for which final consumer is the ME (of the UE 702). In some examples, the secured packet mechanism may encrypt packets that identify certain UE parameters to be updated.

The UDM 708 invokes Nausf_UPUProtection 712 service operation message by including the UPU Data to the AUSF 706 to get UPU-MAC-I$_{AUSF}$ and Counter$_{UPU}$ in a Nausf_UPUProtection Response 714 from the AUSF 706. If the UDM 708 decided that the UE is to acknowledge the successful security check of the received UE Parameters Update Data, then the UDM 708 includes the ACK Indication in the Nausf_UPUProtection service operation message to signal that it also needs the expected UPU-XMAC-I$_{UE}$. The UPU counter Counter$_{UPU}$ is used to protect against, and/or prevent, replay attacks. The inclusion of UE Parameters Update Data in the calculation of UPU-MAC-I$_{AUSF}$ allows the UE 702 to verify that it has not been tampered by any intermediary. The expected UPU-XMAC-I$_{UE}$ allows the UDM 708 to verify that the UE 702 received the UE Parameters Update Data correctly.

The UDM 708 invokes NUDM_SDM_Notification 716 service operation, which contains UE Parameters Update Data, UPU-MAC-I$_{AUSF}$, Counter$_{UPU}$ within the Access and Mobility Subscription data. If the UDM 708 requests an acknowledgement, it temporarily stores the expected UPU-XMAC-I$_{UE}$. Upon receiving the NUDM_SDM_Notification message, the AMF 704 sends a DL NAS Transport 718 message to the served UE 702. The AMF 704 includes in the DL NAS Transport message the transparent container received from the UDM 708. On receiving the DL NAS Transport 718 message, the UE 702 calculates the UPU-MAC-I$_{AUSF}$ in the same way as the AUSF 706 using the received UE Parameters Update Data and the Counter$_{UPU}$ and verify 720 whether it matches the UPU-MAC-I$_{AUSF}$ value received in the DL NAS Transport 718 message. If the verification of UPU-MAC-I$_{AUSF}$ is successful and the UPU Data include parameters that are protected by the secured packet mechanism, the ME of the UE 702 forwards the secured packet to the USIM of the UE 702. In some examples, the secured packet mechanism may encrypt packets that identify certain UE parameters to be updated. If the verification of UPU-MAC-I$_{AUSF}$ is successful and the UPU Data contains any parameter that is not protected by secure packet, the ME of the UE 702 updates its stored parameters with the received parameters in the Update Data from the UDM 708.

If the UDM 708 requested an acknowledgement from the UE 702 and the UE 702 has successfully verified and updated the UE Parameters Update Data provided by the UDM 708, then the UE 702 sends the UL NAS Transport 722 message to the serving AMF 704. The UE 702 generates the UPU-MAC-I$_{UE}$ and includes the generated UPU-MAC-I$_{UE}$ in a transparent container in the UL NAS Transport 722 message. If a transparent container with the UPU-MAC-I$_{UE}$ was received in the UL NAS Transport 722 message, the AMF 704 sends a NUDM 708_SDM_Info 724 request message with the transparent container to the UDM 708. If the UDM 708 indicated that the UE 702 is to acknowledge the successful security check of the received UE Parameters Update (UPU) Data, then the UDM 708 compares 726 the received UPU-MAC-I$_{UE}$ with the expected UPU-XMAC-I$_{UE}$ that the UDM 708 stored temporarily (e.g., at the sending of the Nudm_SDM_Notification 716).

A UE (such as UE 602 and/or UE 702) may store a key K$_{AUSF}$, a counter Counter$_{SoR}$ for the SoR security procedure 600 of FIG. 6, and/or a counter Counter$_{UPU}$ for the UPU security procedure 700 of FIG. 7. The key K$_{AUSF}$ can be used by the UE for calculating MAC-I$_{AUSF}$. The counters Counter$_{SoR}$ and/or Counter$_{UPU}$ can be used by the UE to prevent replay attacks.

For instance, a value of the SoR counter Counter$_{SoR}$ in messages received by the UE can be compared to the stored value of the SoR counter Counter$_{SoR}$ that is stored in the UE, and the UE can ignore any messages having a SoR counter Counter$_{SoR}$ value that is less than or equal to (not greater than) the stored value of the SoR counter Counter$_{SoR}$ that is stored in the UE. The UE can accept SoR messages that have a value of the SoR counter Counter$_{SoR}$ that is greater than the stored value of the SoR counter Counter$_{SoR}$ that is stored in the UE and that are verified using the key K$_{AUSF}$ (e.g., through the calculation of MAC-I$_{AUSF}$ and/or SoR-MAC-I$_{UE}$ and/or UPU-MAC-I$_{UE}$ and/or MAC-I). Similarly, a value of the UPU counter Counter$_{UPU}$ in messages received by the UE can be compared to the stored value of the UPU counter Counter$_{UPU}$ that is stored in the UE, and the UE can ignore any messages having a UPU counter Counter$_{UPU}$ value that is less than or equal to (not greater than) the stored value of the UPU counter Counter$_{UPU}$ that is stored in the UE. The UE can accept UPU messages that have a value of the UPU counter Counter$_{UPU}$ that is greater than the stored value of the UPU counter Counter$_{UPU}$ that is stored in the UE and that are verified using the key K$_{AUSF}$ (e.g., through the calculation of MAC-I$_{AUSF}$ and/or SoR-MAC-I$_{UE}$ and/or UPU-MAC-I$_{UE}$ and/or MAC-I).

The UE may have different options for data storage units for storing the key K$_{AUSF}$, the SoR counter Counter$_{SoR}$, and/or the UPU counter Counter$_{UPU}$. The storage units may include the USIM and/or non-volatile memory (NVM) of the ME of the UE. For instance, if Service no 123 is provided by the USIM, then the key K$_{AUSF}$ can be stored on the USIM (e.g., in EF$_{5GAUTHKEYS}$ of the USIM); otherwise, the key K$_{AUSF}$ can be stored in the NVM of the ME of the UE. If Service no 123 and Service no 133 are provided by the USIM, then the SoR counter Counter$_{SoR}$ and/or the UPU counter Counter$_{UPU}$ can be stored USIM; otherwise the SoR counter Counter$_{SoR}$ and/or the UPU counter Counter$_{UPU}$ can be stored in NVM of the ME of the UE, for instance along with a Subscription Permanent Identifier (SUPI).

In some example, Service no 123 and/or Service no 133 pertain to 5G security parameters. In an illustrative example, Service no 123 refers to a "5G Security Parameters" service and can be referred to as a "Namf_Communication" service. In some examples, Service no 123 is provided by the Access and Mobility Management Function (AMF) and includes functionalities for registration, connection management, reachability, and mobility management. In some examples, Service no 123 handles communication between the User Equipment (UE) and the core network for maintaining the UE's connection and mobility state. In some examples, Service no 123 indicates whether a sim card (e.g., a SIM(s) 474 and/or USIM) supports storage of keys (e.g., key K$_{AUSF}$) on the sim card. In an illustrative example, Service no 133 refers to a "5G Security Parameters Extended" service and can be referred to as a "Nsmf_PDUSession" service. In some examples, Service no 133 is provided by the Session Management Function (SMF) and includes functionalities for managing PDU sessions, such as session establishment, modification, and release. In some examples, Service no 133 handles allocation of network resources and policies for data sessions, ensuring efficient and secure data transfer between the UE and the data network. In some examples, Service no 133 indicates where (e.g., what storage unit or location) certain counters (e.g., Counter$_{SoR}$, Counter$_{UPU}$) are stored, or are to be stored. In some examples, when Service no 123 is declared "available" then service no 133 is also declared "available."

In some cases, for instance if the USIM provides Service no 123 but not Service no 133, then the key K$_{AUSF}$ can be stored in a first storage unit of the UE (e.g., the USIM) while the SoR counter Counter$_{SoR}$ and/or the UPU counter Counter$_{UPU}$ can be stored in a second storage unit of the UE (e.g., the NVM of the ME of the UE). This divided storage situation can also occur if the USIM is moved from one ME (UE) to another ME (UE). In some cases, in such a divided storage situation, a situation may arise in which the UE may store incorrect value(s) for the SoR counter Counter$_{SoR}$ and/or the UPU counter Counter$_{UPU}$, causing the UE to potentially ignore valid SoR messages and/or UPU messages. For instance, if the key K$_{AUSF}$ is stored on the USIM but the SoR counter Counter$_{SoR}$ and/or the UPU counter Counter$_{UPU}$ are stored on the NVM of the ME, and the user moves the USIM to a second ME and then back to the original ME, this situation may result in a scenario where a counter (SoR or UPU) stored in the ME is incorrectly higher than counter received in a new SoR message or UPU message from the network. This can result in the UE ignoring the newly received SoR message or UPU message due to failure of the counter check (e.g., received Counter value being less than or equal to than the one stored in the NVM of the ME), even when there is no replay attack.

In an illustrative example, the key $K_{AUSF}$ is stored on the USIM and the SoR counter Counter$_{SoR}$ and the UPU counter Counter$_{UPU}$ are not present on the USIM, then the SoR counter Counter$_{SoR}$ and the UPU counter Counter$_{UPU}$ stored in NVM are considered as valid after power up, if the Subscription Permanent Identifier (SUPI) stored in NVM of the ME is equal to the SUPI of the inserted USIM. However, the USIM could have been used in a different ME-2 in the meantime and a new authentication could have been triggered in the ME-2. In this case if the USIM is re-inserted in ME-1, ME-1 would apply the outdated previously stored counters, (e.g., the counters stored in the NVM of ME-1 related to the previous $K_{AUSF}$ might be higher than the counters used in the context of the new $K_{AUSF}$). In such a situation, new SoR messages (and/or UPU messages) would be ignored due to outdated counter values store in NVM of ME-1.

Various undesirable consequences may result if the UE improperly ignores an SoR message or UPU message. For instance, if the UE ignores an SoR message, the UE can be unable to select a preferred visited network (VPLMN) even when the preferred visited network is available and is desired by the home network (HPLMN), which have impact on the roaming business of the concerned operators (e.g., the VPLMN and/or the HPLMN). If the UE ignores a UPU message, the UE can be unable to receive required configuration parameters, which may result in the UE not being able to get associated service.

Systems and methods are described in FIGS. 8-9 that prevent the UE from improperly ignoring SoR messages and UPU messages caused by the divided storage situation discussed above, and thus prevent the undesirable consequences outlined above.

In some examples, the ME stores, in the NVM, a Key Identifier (e.g., "$K_{AUSF}$_ID" or "Key-ID") associated with the key $K_{AUSF}$. The key identifier $K_{AUSF}$_Id can be derived from the $K_{AUSF}$, for instance using an equation $K_{AUSF}$_ID=f ($K_{AUSF}$, SUPI, FixedValue). In this equation, a FixedValue can include an arbitrary hex value such as a Function Code (FC) value and/or an arbitrary string (e.g., "Key ID" or "$K_{AUSF}$-ID"). In this equation, "f" is a key derivation function (KDF) or a hash function such as SHA-256 or another secure hash algorithm (SHA). For instance, if FixedValue is a string reading "$K_{AUSF}$-ID", the equation can read: $K_{AUSF}$_ID=f ($K_{AUSF}$, SUPI, FC-value, "$K_{AUSF}$-ID"). In some examples, this equation (the function f( )) can be used as a Key Derivation Function (KDF).

In some examples, alternatively or additionally, the $K_{AUSF}$ (or a portion of it) can be stored on the ME (e.g., in the NVM), but this may cause potential security issues in certain situations, and can conflict with standards that require the key $K_{AUSF}$ to only be stored on the USIM. Therefore, this is not a preferred embodiment to identify key mismatch scenarios.

When the UE powers up with the same USIM as part of the USIM initialization procedures, the ME derives the $K_{AUSF}$-ID from the value of the key $K_{AUSF}$ value as stored on the USIM, for instance using the equation identified above, and compares the derived $K_{AUSF}$-ID value with the $K_{AUSF}$-ID value previously stored in the NVM of the ME of the UE. Whether the UE powers up with the same USIM or not can be determined by checking whether the SUPI on the USIM is the same as the SUPI stored in the NVM of the ME. If the $K_{AUSF}$-IDs are the same, then the UE need not change its behavior. However, if the $K_{AUSF}$-ID value derived from the key $K_{AUSF}$ value as stored on the USIM does not match the $K_{AUSF}$-ID value stored in the NVM of the ME of the UE, the UE can replace the $K_{AUSF}$-ID value stored in the NVM of the ME of the UE and/or perform other actions as outlined in FIGS. 8-9.

In a first illustrative example, if the $K_{AUSF}$-ID value derived from the key $K_{AUSF}$ value as stored on the USIM does not match the $K_{AUSF}$-ID value stored in the NVM of the ME of the UE, the UE can replace the $K_{AUSF}$-ID value stored in the NVM of the ME of the UE with the $K_{AUSF}$-ID value derived from the key $K_{AUSF}$ value stored in the USIM, for instance after verifying the integrity (e.g., using MAC-I$_{AUSF}$ and/or SoR-MAC-I$_{UE}$ and/or UPU-MAC-I$_{UE}$ and/or MAC-I) of a received message (e.g., SoR or UPU) using the key $K_{AUSF}$ value stored in the USIM (which also serves as an indicator of validity of the key $K_{AUSF}$ value stored in the USIM). In this first illustrative example, the UE can also replace the value of a counter (e.g., the SoR counter Counter$_{SoR}$ and/or the UPU counter Counter$_{UPU}$) stored in the NVM of the ME of the UE with a corresponding value of the same counter received in the message for which the UE verified integrity (e.g., using MAC-I$_{AUSF}$ and/or SoR-MAC-I$_{UE}$ and/or UPU-MAC-I$_{UE}$ and/or MAC-I).

In a second illustrative example, if the $K_{AUSF}$-ID value derived from the key $K_{AUSF}$ value as stored on the USIM does not match the $K_{AUSF}$-ID value stored in the NVM of the ME of the UE, the UE can invalidate one or more security keys (e.g., including key $K_{AUSF}$), for instance by setting a Key Set Identifier (KSI) value to "111" in a Non-Access Stratum (NAS) Registration Request (e.g., KSI value of the ngKSI or the next-generation Key Set Identifier in 5G). Setting the KSI value to '111' invalidates the existing security context and can be used to trigger the network to perform a new primary authentication and establish a new security context, for instance generating, providing, and/or providing information for the UE to generate, a new set of keys (e.g., including a new key $K_{AUSF}$). In this second illustrative example, the UE can delete all SoR context (e.g., including the SoR counter Counter$_{SoR}$) and/or all UPU context (e.g., including the UPU counter Counter$_{UPU}$) stored in the NVM of the ME of the UE. Once a new key $K_{AUSF}$ is established, the UE and/or the network can reset the counters (e.g., the SoR counter Counter$_{SoR}$ and/or the UPU counter Counter$_{UPU}$) stored in the NVM of the ME of the UE to zero.

Technical benefits of the first illustrative example above include increased speed and efficiency in correcting a discrepancy in the key identifiers and counter values, and reduced network traffic between the UE and network, because no new primary authentication need be performed. On the other hand, in some examples, it can allow an adversary to replay previously captured SoR/UPU messages associated with the new key $K_{AUSF}$. Technical benefits of the second illustrative example above include increased security (including avoidance of any possibility for a replay attack), as a new primary authentication is performed, ensuring that all 5G security keys, security context, SoR context, and/or UPU context are fresh and accurate.

FIG. 8 is a flow diagram illustrating an example of a process 800 for wireless communications performed at a network device (e.g., a UE). The process 800 for wireless communications may be performed by a wireless communication system. In some examples, the wireless communication system can include, for example, a wireless communications system 100, a user equipment (UE) (e.g., UE 104, UE 152, UE 164, UE 190, UE 602, UE 702), a mobile equipment (ME), a subscriber identity module (SIM) card, a base station (e.g., base station 102, small cell base station 102', millimeter wave (mmW) base station 180), an access point (AP) (e.g., AP 150), a core network (e.g., core network 170, core network 320), a location server 172, a design 200, a transmit processor 220, a transmit processor 264, a receive processor 238, a receive processor 258, a communication unit 244, a controller/processor 290, a controller/processor 266, a disaggregated base station 300 architecture, one or more central units (CUs) 310, one or more distributed units (DUs) 330, one or more radio units (RUs) 340, a Non-Real Time (Non-RT) RAN Intelligent Controller (RIC) 315, a Near-Real Time (Near-RT) RAN Intelligent Controller (RIC) 325, a user device computing system 470, input device(s) 472, SIM(s) 474, modem(s) 476, wireless transceiver(s) 478, output device(s) 480, digital signal processor(s) 482, processor(s) 482, memory device(s) 486, a system using any of the data structures of FIGS. 5A-5D, a Visited Public Land Mobile Network (VPLMN) Access and Mobility Management Function (AMF) 604, a Home Public Land Mobile Network (HPLMN) Authentication Server Function (AUSF) 606, a HPLMN Unified Data Management (UDM) 608, a AMF 704, an AUSF 706, a UDM 708, a wireless communication system that performs the process 900, a computing system 1000, a processor 1110, an image signal processor (ISP), a component of any of the systems listed above, a system, and apparatus, a device, a non-transitory computer readable medium having stored thereon a program to be performed using a processor, or a combination thereof. In some examples, the imaging system includes a display. In some examples, the wireless communication system includes a transceiver and/or other communication interface(s).

At operation 802, the wireless communication system (or component thereof) is configured to, and can, compare a first key identifier to a second key identifier to identify a mismatch between the first key identifier and the second key identifier. The first key identifier is generated (e.g., using a hash function or KDF) from a key (such as $K_{AUSF}$) that is stored in a first storage unit of a user equipment (UE) (e.g., a USIM of the UE). The second key identifier is stored in a second storage unit of the UE (e.g., a NVM of the ME of the UE). In some examples, the second key identifier was generated at an earlier stage from the key (e.g., $K_{AUSF}$). In some examples, operation 802 is followed by operation 804. In some examples, operation 802 is followed by operation 810. Examples of the UE, the ME, and/or the wireless communication system can include, for instance, the UE 104, the UE 152, the UE 164, the UE 182, the UE 190, the wireless device 407, the computing system 470, the UE 602, the UE 702, the wireless communication system and/or UE and/or ME of the process 900, the computing system 1000, or a combination thereof.

At operation 804, the wireless communication system (or component thereof) is configured to, and can, based on the mismatch, replace, in the second storage unit of the UE, the second key identifier with the first key identifier. In some examples, operation 804 is followed by operation 806. In some examples, operation 804 is followed by operation 808.

At operation 806, the wireless communication system (or component thereof) is configured to, and can, receive a message (e.g., a SoR message or a UPU message) and verify integrity of the message using the key. At operation 808, the wireless communication system (or component thereof) is configured to, and can, update a counter (e.g., the SoR counter Counter$_{SoR}$ and/or the UPU counter Counter$_{UPU}$) that is stored in the second storage unit of the UE based on a counter (e.g., the SoR counter Counter$_{SoR}$ and/or the UPU counter Counter$_{UPU}$) that is stored in the message.

At operation 810, the wireless communication system (or component thereof) is configured to, and can, based on the mismatch, replace, in the first storage unit of the UE, the key with a replacement key. At operation 810, the wireless communication system (or component thereof) is configured to, and can also, based on the mismatch, replace, in the second storage unit of the UE, the second key identifier with a third key identifier. The third key identifier is based on the replacement key, for instance being generated by processing the replacement key using a hash function or KDF. At operation 812, the wireless communication system (or component thereof) is configured to, and can, set at least one counter (e.g., the SoR counter Counter$_{SoR}$ and/or the UPU counter Counter$_{UPU}$) that is stored in the second storage unit of the UE to a predetermined value (e.g., zero).

FIG. 9 is a flow diagram illustrating an example of a process 900 for wireless communications performed at a network device (e.g., a UE). The process 900 for wireless communications may be performed by a wireless communication system. In some examples, the wireless communication can include, for example, a wireless communications system 100, a user equipment (UE) (e.g., UE 104, UE 152, UE 164, UE 190, UE 602, UE 702), a mobile equipment (ME), a subscriber identity module (SIM) card, a base station (e.g., base station 102, small cell base station 102', millimeter wave (mmW) base station 180), an access point (AP) (e.g., AP 150), a core network (e.g., core network 170, core network 320), a location server 172, a design 200, a transmit processor 220, a transmit processor 264, a receive processor 238, a receive processor 258, a communication unit 244, a controller/processor 290, a controller/processor 266, a disaggregated base station 300 architecture, one or more central units (CUs) 310, one or more distributed units (DUs) 330, one or more radio units (RUs) 340, a Non-Real Time (Non-RT) RAN Intelligent Controller (RIC) 315, a Near-Real Time (Near-RT) RAN Intelligent Controller (RIC) 325, a user device computing system 470, input device(s) 472, SIM(s) 474, modem(s) 476, wireless transceiver(s) 478, output device(s) 480, digital signal processor(s) 482, processor(s) 482, memory device(s) 486, a system using any of the data structures of FIGS. 5A-5D, a Visited Public Land Mobile Network (VPLMN) Access and Mobility Management Function (AMF) 604, a Home Public Land Mobile Network (HPLMN) Authentication Server Function (AUSF) 606, a HPLMN Unified Data Management (UDM) 608, a AMF 704, an AUSF 706, a UDM 708, a wireless communication system that performs the process 800, a computing system 1000, a processor 1110, an image signal processor (ISP), a component of any of the systems listed above, a system, and apparatus, a device, a non-transitory computer readable medium having stored thereon a program to be performed using a processor, or a combination thereof. In some examples, the imaging system includes a display. In some examples, the wireless communication system includes a transceiver and/or other communication interface(s).

At operation 902, the wireless communication system (or component thereof) is configured to, and can, compare a first key identifier to a second key identifier to identify a mismatch between the first key identifier and the second key identifier. The first key identifier is generated from a key (e.g., $K_{AUSF}$) that is stored in a first storage unit (e.g., first storage location) of a user equipment (UE). The second key identifier is stored in a second storage unit (e.g., second storage location) of the UE. In some aspects, operation 902 can include, or be included in, operation 802. Examples of the UE (and/or the wireless communication system) can include, for instance, the UE 104, the UE 152, the UE 164, the UE 182, the UE 190, the wireless device 407, the computing system 470, the UE 602, the UE 702, the wireless communication system and/or UE of the process 800, the computing system 1000, or a combination thereof.

In some examples, the second key identifier of operation 902 is also generated from the key that is stored in a first storage unit of the UE. In some examples, the second key identifier is generated from, and/or associated with, the key at an earlier stage or earlier time compared to the generation of the first key identifier from the key. In some examples, the second key identifier is generated from, and/or associated with, a prior variant of the key, or a prior key that was previously stored at the first storage unit of the UE. In some examples, the prior key is different from the key. For instance, in some examples, the prior key can be a second key used by a second UE, apparatus, or wireless communication system. For instance, this may happen if the first storage unit is a removable storage unit such as a USIM or other SIM card, and the removable storage unit is moved from the UE to the second UE and back to the UE.

In some aspects, the first storage unit is a subscriber identity module (SIM) of the UE and/or a universal subscriber identity module (USIM) of the UE (e.g., the SIM(s) 474 of the wireless device 407). In some aspects, the SIM or USIM is a physical SIM or USIM (e.g., a SIM card or USIM card), for instance inserted into a slot in the UE. In some aspects, the SIM or USIM is a virtual SIM or virtual USIM (e.g., an eSIM). In some aspects, the second storage unit is external to (e.g., and/or different from) the SIM and/or external to (e.g., and/or different from) the USIM. In some aspects, the second storage unit is in a non-volatile memory (NVM) of the UE (e.g., a NVM of a mobile equipment (ME) of the UE) (e.g., memory device(s) 486 of the wireless device 407). Examples of the ME can include, for instance, portion(s) of the UE 104, the UE 152, the UE 164, the UE 182, the UE 190, the wireless device 407, the computing system 470, the UE 602, the UE 702, the wireless communication system and/or UE of the process 800, the computing system 1000, or a combination thereof. In some examples, the ME can refer to a remainder of the UE other than the SIM and/or USIM.

In some aspects, a Service no 123 and/or a Service no 133 is available in a USIM Service Table $EF_{UST}$ of the UE (e.g., of the USIM of the UE). In some aspects, between the Service no 123 and the Service no 133, one of the services is available while the other one of the services is unavailable. In an illustrative example, the Service no 123 may be available in the USIM while the Service no 133 is unavailable in the USIM. In some examples, a mismatch in availability between Service no 123 and Service no 133 may cause the mismatch identified in operation 904.

In some aspects, the wireless communication system (or component thereof) is configured to, and can, detect receipt of the USIM by the UE (e.g., detect the USIM being received by the UE and/or coupled with the UE). In some examples, the USIM is removable. In some aspects, the wireless communication system (or component thereof) is configured to, and can, detect coupling with the USIM. In some aspects, the USIM includes data from a second UE distinct from the UE, and was previously used in the second UE distinct. In some examples, the data from the second apparatus includes the key, the first key identifier, and/or the second key identifier, the counter $Counter_{UPU}$, the counter $Counter_{SoR}$, or a combination thereof.

In some aspects, the wireless communication system (or component thereof) is configured to, and can, use a hash function to generate the first key identifier from the key (and/or to generate the second key identifier from the key). In some aspects, the hash function is a secure hash algorithm (SHA), such as SHA-256. In some aspects, the wireless communication system (or component thereof) is configured to, and can, use a Key Derivation Function (KDF) function to generate the first key identifier from the key (and/or to generate the second key identifier from the key).

In some aspects, the first key identifier and the second key identifier are both associated with the a specific function (e.g., the same function as one another, such as the Authentication Server Function (AUSF)). In some aspects, the key is an Authentication Server Function (AUSF) key $K_{AUSF}$ (e.g., associated with HPLMN AUSF 606 and/or AUSF 706).

At operation 904, the wireless communication system (or component thereof) is configured to, and can, replace the second key identifier in the second storage unit of the UE based on the mismatch. For instance, operation 904 can include replacing the second key identifier with the first key identifier (from operation 902) or with a third key identifier (e.g., associated with invalidating the key and/or replacing the key with a replacement key as discussed herein).

In some aspects, to replace the second key identifier in the second storage unit of the UE (at operation 904), the wireless communication system (or component thereof) is configured to, and can, replace, in the second storage unit of the UE, the second key identifier with the first key identifier (e.g., as in operation 804).

In some aspects, the wireless communication system (or component thereof) is configured to, and can, receive a message and verify integrity (e.g., using MAC-$I_{AUSF}$ and/or SoR-MAC-$I_{UE}$ and/or UPU-MAC-$I_{UE}$ and/or MAC-I) of the message using the key as stored in the first storage unit of the UE (e.g., as in operation 806). In some aspects, the wireless communication system's replacing of the second key identifier with the first key identifier in the second storage unit of the UE is also based on the verifying of the integrity of the message using the key. For instance, verifying of the integrity of the message using the key can also verify that the key is valid. In some aspects, the wireless communication system (or component thereof) verifies the integrity of the message using the key after the mismatch is already identified (e.g., after or during operation 902). In some aspects, the wireless communication system (or component thereof) verifies the integrity of the message using the key before the mismatch is identified (e.g., before or during operation 902).

In some aspects, the wireless communication system (or component thereof) is configured to, and can, update a counter (e.g., the SoR counter $Counter_{SoR}$ and/or the UPU counter $Counter_{UPU}$, for instance as illustrated in FIGS. 6-7) that is stored in the second storage unit of the UE based on an update to the counter in the message in response to the verifying of the integrity of the message using the key (e.g., as in operation 808). In some aspects, the message is a Steering of Roaming (SoR) message, and the counter is a SoR counter ($Counter_{SoR}$). In some aspects, the message is a UE Parameters Update (UPU) message, and the counter is a UPU counter ($Counter_{UPU}$).

In some aspects, the wireless communication system (or component thereof) is configured to, and can, invalidate the key based on the mismatch, for instance by setting a Key Set Identifier (KSI) value to a predetermined value (e.g., "111") in a Non-Access Stratum (NAS) Registration Request to invalidate the key. In some aspects, the wireless communication system (or component thereof) is configured to, and can, replace, in the first storage unit of the UE, the key with a replacement key (e.g., as in operation 810). In some aspects, to replace the second key identifier in the second storage unit of the UE based on the mismatch (as in operation 904), the wireless communication system (or component thereof) is configured to, and can, replace, in the second storage unit of the UE, the second key identifier with a third key identifier to replace the second key identifier based on the mismatch, wherein the third key identifier is based on the replacement key (e.g., as in operation 810). In some aspects, the wireless communication system (or component thereof) is configured to, and can, perform a new primary authentication.

In some aspects, the wireless communication system (or component thereof) is configured to, and can, reset at least one counter (e.g., the SoR counter $Counter_{SoR}$ and/or the UPU counter $Counter_{UPU}$) to a predetermined value (e.g., zero) (e.g., as in operation 812). In some aspects, the counter is a SoR counter ($Counter_{SoR}$). In some aspects, the counter is a UPU counter ($Counter_{UPU}$).

In some examples, the processes described herein (e.g., the process 800, the process 900, and/or other process described herein) may be performed by a computing device or apparatus. For example, as noted above the process 800 can be performed by a network device (e.g., the UE 602 of FIG. 6 and/or the UE 702 of FIG. 7). As further noted above, the process 900 can be performed by a network entity (e.g., the HPLMN UDM 608 of FIG. 6 and/or the UDM 708 of FIG. 7).

The computing device can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a television, and/or any other computing device with the resource capabilities to perform the processes described herein, including the process 800, the process 900, and/or other process described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 800 and the process 900 are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 800, the process 900, and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 10:
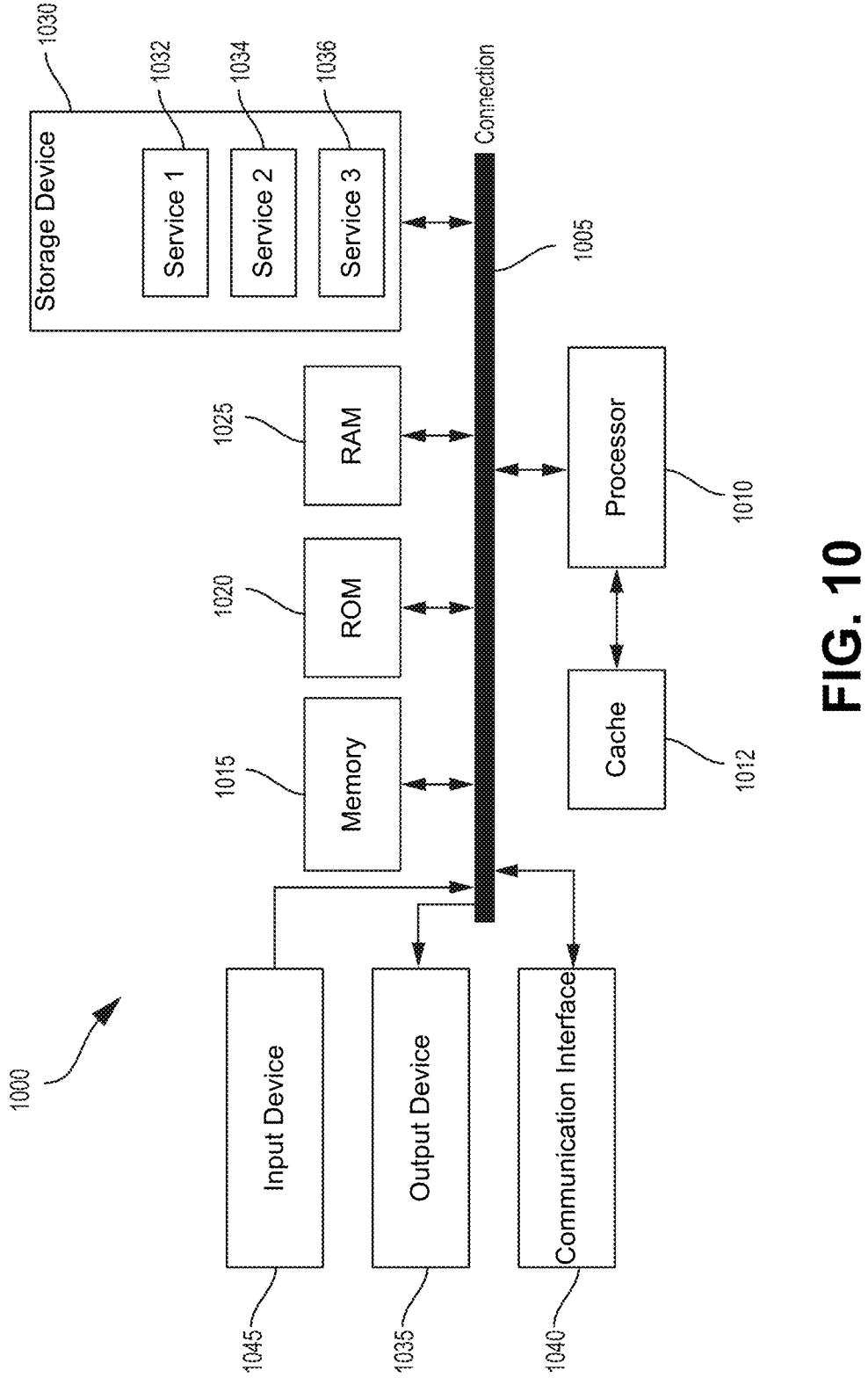
FIG. 10 is a diagram illustrating an example of a computing system, according to aspects of the disclosure.

FIG. 10 is a diagram illustrating an example of a system for implementing certain aspects of the present technology. In particular, FIG. 10 illustrates an example of computing system 1000, which may be for example any computing device making up internal computing system, a remote computing system, a camera, or any component thereof in which the components of the system are in communication with each other using connection 1005. Connection 1005 may be a physical connection using a bus, or a direct connection into processor 1010, such as in a chipset architecture. Connection 1005 may also be a virtual connection, networked connection, or logical connection.

In some embodiments, computing system 1000 is a distributed system in which the functions described in this disclosure may be distributed within a datacenter, multiple data centers, a peer network, etc. In some embodiments, one or more of the described system components represents many such components each performing some or all of the function for which the component is described. In some embodiments, the components may be physical or virtual devices.

Example system 1000 includes at least one processing unit (CPU or processor) 1010 and connection 1005 that communicatively couples various system components including system memory 1015, such as read-only memory (ROM) 1020 and random access memory (RAM) 1025 to processor 1010. Computing system 1000 may include a cache 1012 of high-speed memory connected directly with, in close proximity to, or integrated as part of processor 1010.

Processor 1010 may include any general purpose processor and a hardware service or software service, such as services 1032, 1034, and 1036 stored in storage device 1030, configured to control processor 1010 as well as a special-purpose processor where software instructions are incorporated into the actual processor design. Processor 1010 may essentially be a completely self-contained computing system, containing multiple cores or processors, a bus, memory controller, cache, etc. A multi-core processor may be symmetric or asymmetric.

To enable user interaction, computing system 1000 includes an input device 1045, which may represent any number of input mechanisms, such as a microphone for speech, a touch-sensitive screen for gesture or graphical input, keyboard, mouse, motion input, speech, etc. Computing system 1000 may also include output device 1035, which may be one or more of a number of output mechanisms. In some instances, multimodal systems may enable a user to provide multiple types of input/output to communicate with computing system 1000.

Computing system 1000 may include communications interface 1040, which may generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1040 may also include one or more Global Navigation Satellite System (GNSS) receivers or transceivers that are used to determine a location of the computing system 1000 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1030 may be a non-volatile and/or non-transitory and/or computer-readable memory device and may be a hard disk or other types of computer readable media which may store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EE-PROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/Re-RAM), phase change memory (PCM), spin transfer torque RAM (STT-RAM), another memory chip or cartridge, and/or a combination thereof.

The storage device 1030 may include software services, servers, services, etc., that when the code that defines such software is executed by the processor 1010, it causes the system to perform a function. In some embodiments, a hardware service that performs a particular function may include the software component stored in a computer-readable medium in connection with the necessary hardware components, such as processor 1010, connection 1005, output device 1035, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the embodiments and examples provided herein, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments may be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual embodiments may be described above as a process or method which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination may correspond to a return of the function to the calling function or the main function.

Processes and methods according to the above-described examples may be implemented using computer-executable instructions that are stored or otherwise available from computer-readable media. Such instructions may include, for example, instructions and data which cause or otherwise configure a general purpose computer, special purpose computer, or a processing device to perform a certain function or group of functions. Portions of computer resources used may be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some embodiments the computer-readable storage devices, mediums, and memories may include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and may take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also may be embodied in peripherals or add-in cards. Such functionality may also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that may be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that less than ("<") and greater than (">") terminology used herein may be replaced with less than or equal to ("≤") and greater than or equal to ("≥") terminology, respectively, or vice versa, without departing from the scope of this description.

Where components are described as being "configured to" perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

Illustrative aspects of the disclosure include:

Aspect 1. An apparatus for wireless communications, comprising: at least one memory comprising instructions; and at least one processor coupled to the at least one memory and configured to: compare a first key identifier to a second key identifier to identify a mismatch between the first key identifier and the second key identifier, wherein the first key identifier is generated from a key that is stored in a first storage unit of the apparatus, wherein the second key identifier is stored in a second storage unit of the apparatus; and replace, in the second storage unit of the apparatus, the second key identifier based on the mismatch.

Aspect 2. The apparatus of Aspect 1, wherein the first storage unit is a universal subscriber identity module (USIM) of the apparatus, and wherein the second storage unit is external to the USIM.

Aspect 3. The apparatus of Aspect 2, wherein the second storage unit is in a non-volatile memory of the apparatus.

Aspect 4. The apparatus of any of Aspects 2 to 3, wherein at least one of a Service no 123 or a Service no 133 is available in a USIM Service Table $EF_{UST}$ of the USIM.

Aspect 5. The apparatus of any of Aspects 2 to 4, wherein the at least one processor is configured to: detect receipt of the USIM.

Aspect 6. The apparatus of Aspect 5, wherein the USIM includes data from a second apparatus distinct from the apparatus, the USIM having been previously used in the second apparatus.

Aspect 7. The apparatus of any of Aspects 1 to 6, wherein the at least one processor is configured to: replace, in the second storage unit of the apparatus, the second key identifier with the first key identifier to replace the second key identifier based on the mismatch.

Aspect 8. The apparatus of Aspect 7, wherein the at least one processor is configured to: receive a message; and verify integrity of the message using the key as stored in the first storage unit of the apparatus, wherein replacing the second key identifier with the first key identifier in the second storage unit of the apparatus is also based on the verifying of the integrity of the message using the key.

Aspect 9. The apparatus of Aspect 8, wherein the at least one processor is configured to: update a counter that is stored in the second storage unit of the apparatus based on an update to the counter in the message in response to the verifying of the integrity of the message using the key.

Aspect 10. The apparatus of Aspect 9, wherein the message is a Steering of Roaming (SoR) message, and wherein the counter is a SoR counter.

Aspect 11. The apparatus of any of Aspects 9 to 10, wherein the message is a User Equipment Parameters Update (UPU) message, and wherein the counter is a UPU counter.

Aspect 12. The apparatus of any of Aspects 1 to 11, wherein the at least one processor is configured to: invalidate the key based on the mismatch; replace, in the first storage unit of the apparatus, the key with a replacement key; and replace, in the second storage unit of the apparatus, the second key identifier with a third key identifier to replace the second key identifier based on the mismatch, wherein the third key identifier is based on the replacement key.

Aspect 13. The apparatus of Aspect 12, wherein the at least one processor is configured to: set a Key Set Identifier (KSI) value to a predetermined value in a Non-Access Stratum (NAS) Registration Request to invalidate the key.

Aspect 14. The apparatus of any of Aspects 12 to 13, wherein the at least one processor is configured to: perform a primary authentication.

Aspect 15. The apparatus of any of Aspects 12 to 14, wherein the at least one processor is configured to: reset at least one counter to a predetermined value.

Aspect 16. The apparatus of Aspect 15, wherein the at least one counter includes a Steering of Roaming (SoR) counter.

Aspect 17. The apparatus of any of Aspects 15 to 16, wherein the at least one counter includes a User Equipment Parameters Update (UPU) counter.

Aspect 18. The apparatus of any of Aspects 1 to 17, wherein the at least one processor is configured to: use a hash function to generate the first key identifier from the key.

Aspect 19. The apparatus of Aspect 18, wherein the hash function is a Secure Hash Algorithm (SHA).

Aspect 20. The apparatus of any of Aspects 18 to 19, wherein the hash function is Secure Hash Algorithm (SHA)-256.

Aspect 21. The apparatus of any of Aspects 1 to 20, wherein the at least one processor is configured to: use a Key Derivation Function (KDF) to generate the first key identifier from the key.

Aspect 22. The apparatus of any of Aspects 1 to 21, wherein the key is an Authentication Server Function (AUSF) key $K_{AUSF}$.

Aspect 23. The apparatus of any of Aspects 1 to 22, wherein the apparatus is a user equipment (UE).

Aspect 24. The apparatus of any of Aspects 1 to 23, wherein the apparatus is a mobile equipment (ME) configured to be coupled to a universal subscriber identity module (USIM).

Aspect 25. A method of wireless communication, the method comprising: comparing a first key identifier to a second key identifier to identify a mismatch between the first key identifier and the second key identifier, wherein the first key identifier is generated from a key that is stored in a first storage unit of a user equipment (UE), wherein the second key identifier is stored in a second storage unit of the UE; and replacing, in the second storage unit of the UE, the second key identifier based on the mismatch.

Aspect 26. The method of Aspect 25, wherein the first storage unit is a universal subscriber identity module (USIM) of the UE, and wherein the second storage unit is external to the USIM.

Aspect 27. The method of Aspect 26, wherein the second storage unit is in a non-volatile memory of the UE.

Aspect 28. The method of any of Aspects 26 to 27, wherein at least one of a Service no 123 or a Service no 133 is available in a USIM Service Table $EF_{UST}$ of the USIM.

Aspect 29. The method of any of Aspects 26 to 28, further comprising: detecting receipt of the USIM.

Aspect 30. The method of Aspect 29, wherein the USIM includes data from a second UE distinct from the UE, the USIM having been previously used in the second UE.

Aspect 31. The method of any of Aspects 25 to 30, further comprising: replacing, in the second storage unit of the UE, the second key identifier with the first key identifier to replace the second key identifier based on the mismatch.

Aspect 32. The method of Aspect 31, further comprising: receiving a message; and verifying integrity of the message using the key as stored in the first storage unit of the UE, wherein replacing the second key identifier with the first key identifier in the second storage unit of the UE is also based on the verifying of the integrity of the message using the key.

Aspect 33. The method of Aspect 32, further comprising: updating a counter that is stored in the second storage unit of the UE based on an update to the counter in the message in response to the verifying of the integrity of the message using the key.

Aspect 34. The method of Aspect 33, wherein the message is a Steering of Roaming (SoR) message, and wherein the counter is a SoR counter.

Aspect 35. The method of any of Aspects 33 to 34, wherein the message is a UE Parameters Update (UPU) message, and wherein the counter is a UPU counter.

Aspect 36. The method of any of Aspects 25 to 35, further comprising: invalidating the key based on the mismatch; replacing, in the first storage unit of the UE, the key with a replacement key; and replacing, in the second storage unit of the UE, the second key identifier with a third key identifier to replace the second key identifier based on the mismatch, wherein the third key identifier is based on the replacement key.

Aspect 37. The method of Aspect 36, further comprising: setting a Key Set Identifier (KSI) value to a predetermined value in a Non-Access Stratum (NAS) Registration Request to invalidate the key.

Aspect 38. The method of any of Aspects 36 to 37, further comprising: performing a primary authentication.

Aspect 39. The method of any of Aspects 36 to 38, further comprising: resetting at least one counter to a predetermined value.

Aspect 40. The method of Aspect 39, wherein the at least one counter includes a Steering of Roaming (SoR) counter.

Aspect 41. The method of any of Aspects 39 to 40, wherein the at least one counter includes a UE Parameters Update (UPU) counter.

Aspect 42. The method of any of Aspects 25 to 41, further comprising: using a hash function to generate the first key identifier from the key.

Aspect 43. The method of Aspect 42, wherein the hash function is a Secure Hash Algorithm (SHA).

Aspect 44. The method of any of Aspects 42 to 43, wherein the hash function is Secure Hash Algorithm (SHA)-256.

Aspect 45. The method of any of Aspects 25 to 44, further comprising: using a Key Derivation Function (KDF) to generate the first key identifier from the key.

Aspect 46. The method of any of Aspects 25 to 45, wherein the key is an Authentication Server Function (AUSF) key $K_{AUSF}$.

Aspect 47. The method of any of Aspects 25 to 46, wherein the method is performed by the UE.

Aspect 48. The method of any of Aspects 25 to 47, wherein the method is performed by a mobile equipment (ME) of the UE.

Aspect 49. A non-transitory computer-readable medium having stored thereon instructions that, when executed by at least one processor, cause the at least one processor to perform operations according to any of Aspects 1 to 48.

Aspect 50. An apparatus for wireless communications, comprising one or more means for performing operations according to any of Aspects 1 to 48.

What is claimed is:

1. An apparatus for wireless communications, comprising:
   at least one memory comprising instructions; and
   at least one processor coupled to the at least one memory and configured to:
      identify a change associated with a removable storage unit;
      set, in response to the change, a Key Set Identifier (KSI) to a predetermined value; and
      invalidate, in response to the change, a security context, wherein the security context is not the KSI.

2. The apparatus of claim 1, wherein the at least one processor is configured to:
   delete, in response to the change, a key.

3. The apparatus of claim 2, wherein the key is an Authentication Server Function (AUSF) key $K_{AUSF}$.

4. The apparatus of claim 2, wherein the at least one processor is configured to:
   initiate an authentication procedure to cause a new instance of the key to be generated to replace the key.

5. The apparatus of claim 1, wherein the removable storage unit is a universal subscriber identity module (USIM) that corresponds to the security context, and wherein the change associated with the removable storage unit includes a removal of the USIM from the apparatus.

6. The apparatus of claim 5, wherein the at least one processor is configured to:
   delete, in response to the change, a key that corresponds to the USIM.

7. The apparatus of claim 1, wherein the removable storage unit is a first universal subscriber identity module (USIM) that corresponds to the security context, and wherein the change associated with the removable storage unit includes a change from the first USIM to a second USIM.

8. The apparatus of claim 7, wherein the at least one processor is configured to:
   delete, in response to the change, a key that corresponds to the first USIM.

9. The apparatus of claim 1, wherein the removable storage unit is a universal subscriber identity module (USIM) that corresponds to the security context, and wherein the change associated with the removable storage unit includes a key being stored on the USIM and a counter being not present on the USIM, wherein the counter is associated with at least one of Steering of Roaming (SoR) or User equipment Parameters Update (UPU).

10. The apparatus of claim 9, wherein the at least one processor is configured to:
   delete, in response to the change, a key that corresponds to the USIM.

11. The apparatus of claim 1, wherein the removable storage unit is a universal subscriber identity module (USIM) that corresponds to the security context and that stores a first instance of a key, and wherein the change associated with the removable storage unit includes the USIM storing a second instance of the key that is different from the first instance of the key.

12. The apparatus of claim 11, wherein the at least one processor is configured to:
   delete, in response to the change, the second instance of the key from the USIM.

13. The apparatus of claim 11, wherein the at least one processor is configured to:
   delete, in response to the change, the first instance of the key from a second storage unit.

14. The apparatus of claim 1, wherein the predetermined value is 111.

15. The apparatus of claim 1, wherein the predetermined value indicates that a key is invalid.

16. The apparatus of claim 1, wherein the at least one processor is configured to:
   initiate an authentication procedure to cause a new security context to be generated to replace the security context.

17. The apparatus of claim 1, wherein the at least one processor is configured to:
   initiate an authentication procedure based on the KSI being set to the predetermined value.

18. The apparatus of claim 1, wherein the KSI is a next-generation KSI (ngKSI) associated with a fifth-generation (5G) cellular network.

19. The apparatus of claim 1, wherein the security context includes at least one of Steering of Roaming (SoR) context or User equipment Parameters Update (UPU) context.

20. The apparatus of claim 1, wherein, to invalidate the security context, the at least one processor is configured to delete the security context.

21. A method of wireless communications, the method comprising:
   identifying a change associated with a removable storage unit;
   setting, in response to the change, a Key Set Identifier (KSI) to a predetermined value; and
   invalidating, in response to the change, a security context, wherein the security context is not the KSI.

* * * * *